US012567946B2

(12) United States Patent (10) Patent No.: US 12,567,946 B2
Ohba (45) Date of Patent: Mar. 3, 2026

(54) ENCRYPTION DEVICE, DECRYPTION DEVICE, STORAGE SYSTEM, INFORMATION PROCESSING DEVICE, ENCRYPTION METHOD, DECRYPTION METHOD, DECOMPRESSION DEVICE, AND DECOMPRESSION METHOD

(71) Applicant: Kioxia Corporation, Tokyo (JP)

(72) Inventor: Yoshihiro Ohba, Kawasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 278 days.

(21) Appl. No.: 18/204,878

(22) Filed: Jun. 1, 2023

(65) Prior Publication Data

US 2023/0396411 A1 Dec. 7, 2023

(30) Foreign Application Priority Data

Jun. 3, 2022 (JP) ................................. 2022-090731
Mar. 20, 2023 (JP) ................................. 2023-044386

(51) Int. Cl.
*H04L 9/06* (2006.01)
*H04L 9/08* (2006.01)
*H04L 9/30* (2006.01)

(52) U.S. Cl.
CPC .......... *H04L 9/0618* (2013.01); *H04L 9/0869* (2013.01); *H04L 9/30* (2013.01)

(58) Field of Classification Search
CPC ............ H04L 9/618; H04L 9/869; H04L 9/30
See application file for complete search history.

(56) References Cited

U.S. PATENT DOCUMENTS

| | | | | |
|---|---|---|---|---|
| 10,020,819 | B1 * | 7/2018 | Diamant | H03M 7/4037 |
| 10,652,220 | B1 * | 5/2020 | Ramanujan | H04L 63/0272 |
| 2010/0046742 | A1 * | 2/2010 | Muratani | H04L 9/3013 380/28 |
| 2010/0046745 | A1 * | 2/2010 | Hanatani | H04L 9/3073 380/30 |

(Continued)

FOREIGN PATENT DOCUMENTS

| | | |
|---|---|---|
| JP | 2020-537191 A | 12/2020 |
| JP | 2020-537450 A | 12/2020 |

OTHER PUBLICATIONS

Brakerski, Zvika et al., "(Leveled) Fully Homomorphic Encryption without Bootstrapping", ACM Transactions on Computation Theory (vol. 6, No. 3), 2014, 35 pages, DOI: 10.1145/2633600.

(Continued)

*Primary Examiner* — Darshan I Dhruv

(74) *Attorney, Agent, or Firm* — Maier & Maier, PLLC

(57) ABSTRACT

According to one embodiment, an encryption device includes a generator configured to generate an N-dimensional random number vector, a calculator configured to calculate a value of a predetermined function for the random number vector, and an encryption circuit configured to encrypt the leading component by a public key of N rows and (n+1) columns having an (n+1)-dimensional regular submatrix and the N-dimensional random number vector and encrypt each of the subsequent components by the public key and an output of the calculator.

14 Claims, 19 Drawing Sheets

(56)     References Cited

U.S. PATENT DOCUMENTS

| | | | | |
|---|---|---|---|---|
| 2011/0103580 A1* | 5/2011 | Hazay | H04L 9/32 | 707/802 |
| 2014/0129824 A1* | 5/2014 | Paris | H04L 9/0637 | 713/150 |
| 2015/0293858 A1* | 10/2015 | Raam | G06F 21/78 | 713/193 |
| 2017/0155504 A1* | 6/2017 | Hazay | H04L 69/04 | |
| 2018/0034784 A1* | 2/2018 | Sinclair | H04L 63/0428 | |
| 2019/0312728 A1 | 10/2019 | Poeppelmann | | |
| 2020/0259649 A1* | 8/2020 | Garcia Morchon | H04L 9/0838 | |
| 2020/0304305 A1* | 9/2020 | Garcia Morchon | H04L 9/3093 | |
| 2021/0011637 A1* | 1/2021 | Shah | G06F 3/0608 | |
| 2021/0234841 A1* | 7/2021 | Abali | H04L 63/0428 | |
| 2022/0171555 A1* | 6/2022 | Ponnuswamy | H04L 67/1097 | |
| 2023/0100106 A1* | 3/2023 | Dewan | G06F 3/061 | 713/193 |

OTHER PUBLICATIONS

Pre-publication version of: Saarinen, Markku-Juhani Olavi, "Ring-LWE Ciphertext Compression and Error Correction: Tools for Lightweight Post-Quantum Cryptography", Proceedings of the 3rd ACM International Workshop on IoT Privacy, Trust, and Security (IoTPTS '17), 2017, pp. 15-22, DOI: 10.1145/3055245.3055254, https://eprint.iacr.org/2016/1058.pdf.

* cited by examiner

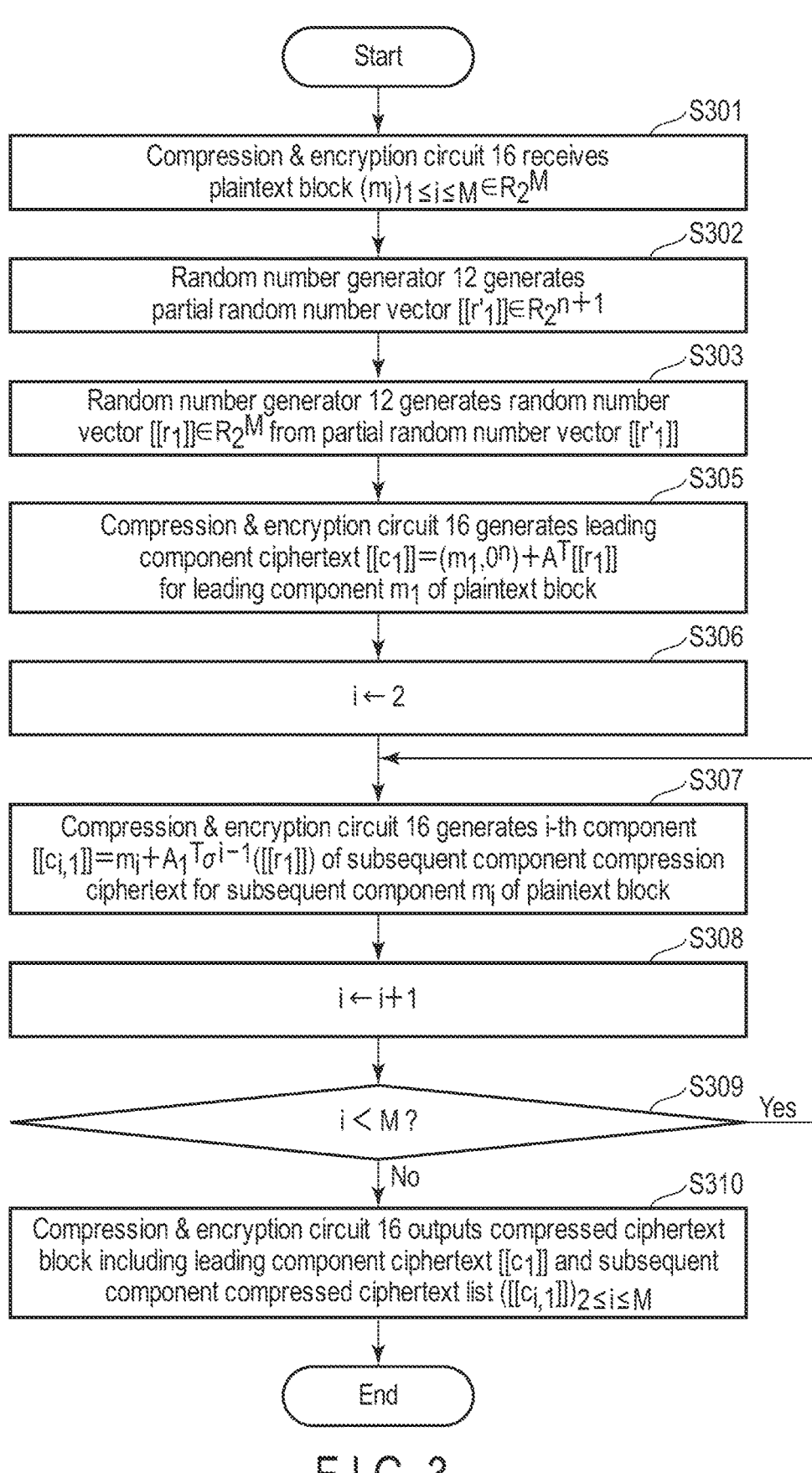
F I G. 3

| | | | | |
|---|---|---|---|---|
| $[[c_{1,1}]]$ $=m_1+A_1^T[[r_1]]$ | $[[c_{1,2}]]$ $=A_2^T[[r_1]]$ | $[[c_{1,3}]]$ $=A_3^T[[r_1]]$ | $\cdots$ | $[[c_{1,n+1}]]$ $=A_{n+1}^T[[r_1]]$ |
| $[[c_{2,1}]]$ $=m_2+A_1^T[[r_2]]$ | $[[c_{2,2}]]$ $=A_2^T[[r_2]]$ | $[[c_{2,3}]]$ $=A_3^T[[r_2]]$ | $\cdots$ | $[[c_{2,n+1}]]$ $=A_{n+1}^T[[r_2]]$ |
| $\cdots$ | $\cdots$ | $\cdots$ | $\cdots$ | $\cdots$ |
| $[[c_{M,1}]]$ $=m_M+A_1^T[[r_M]]$ | $[[c_{M,2}]]$ $=A_2^T[[r_M]]$ | $[[c_{M,3}]]$ $=A_3^T[[r_M]]$ | $\cdots$ | $[[c_{M,n+1}]]$ $=A_{n+1}^T[[r_M]]$ |

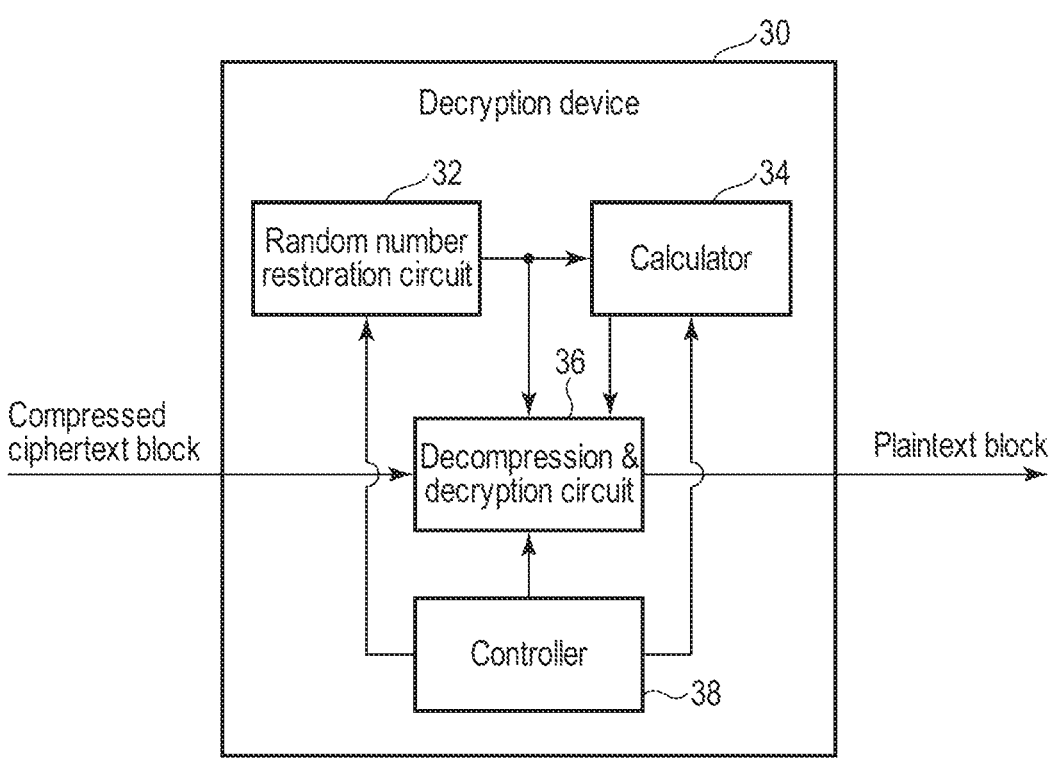
F I G. 5

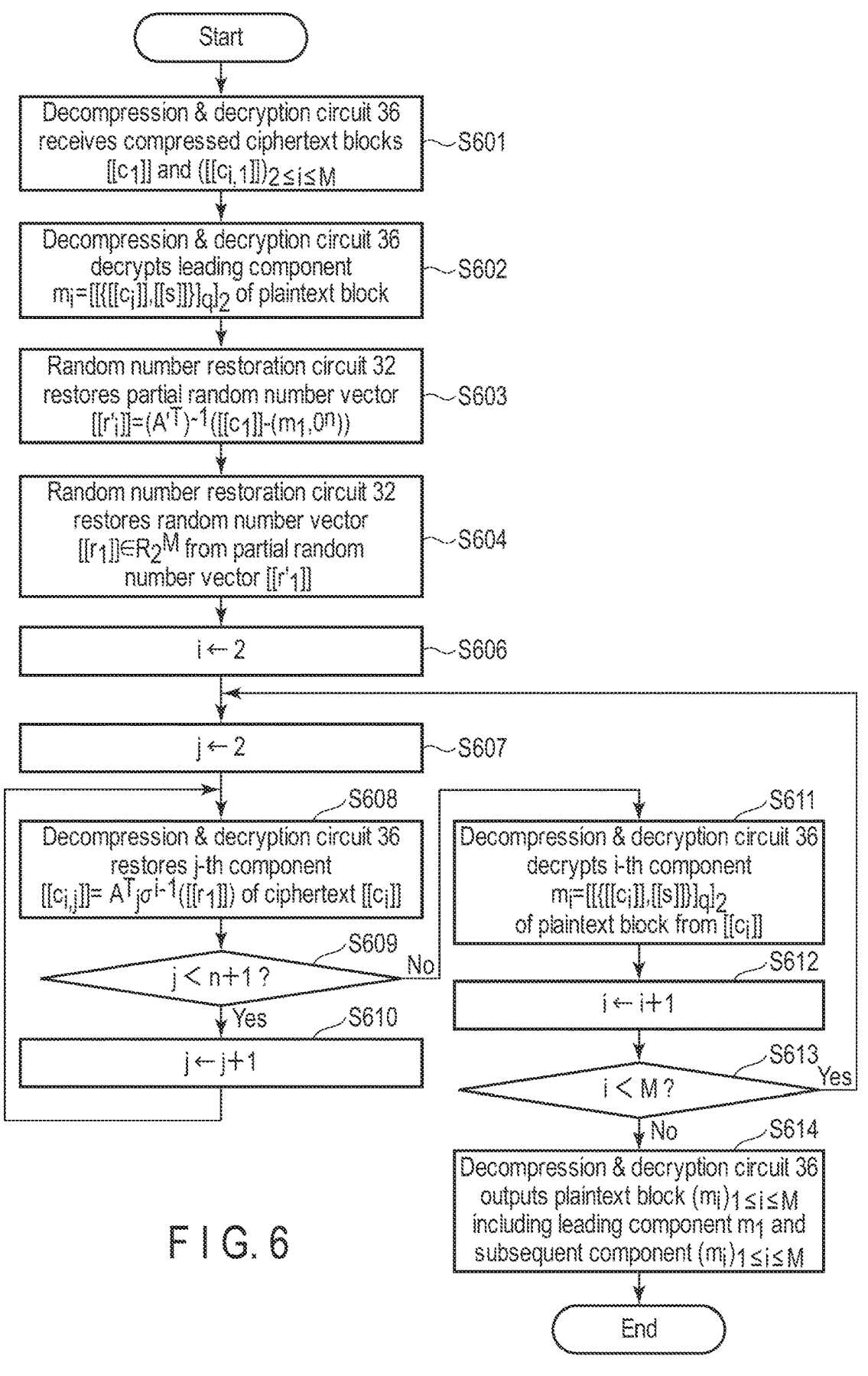
F I G. 6

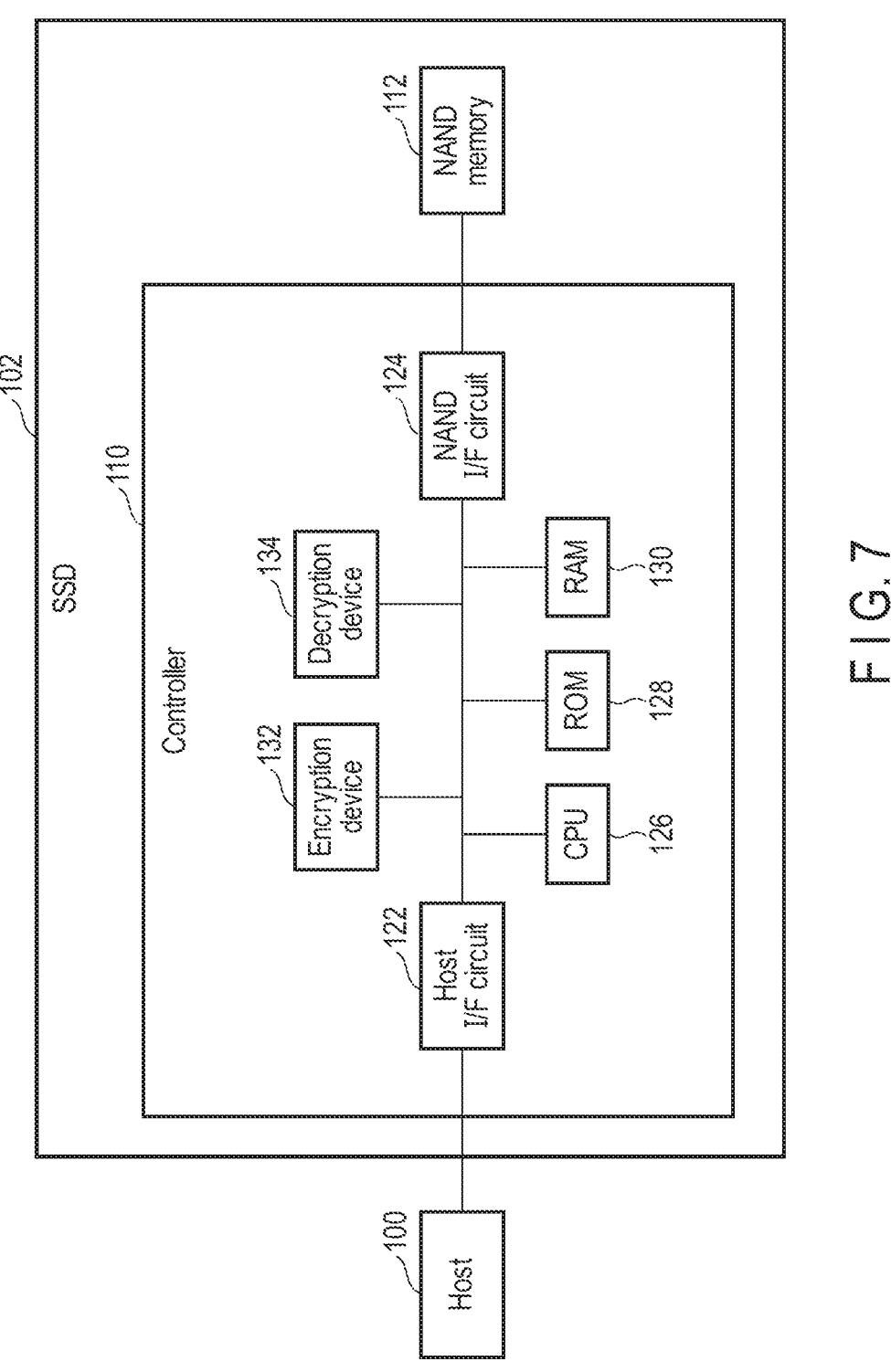
F I G. 7

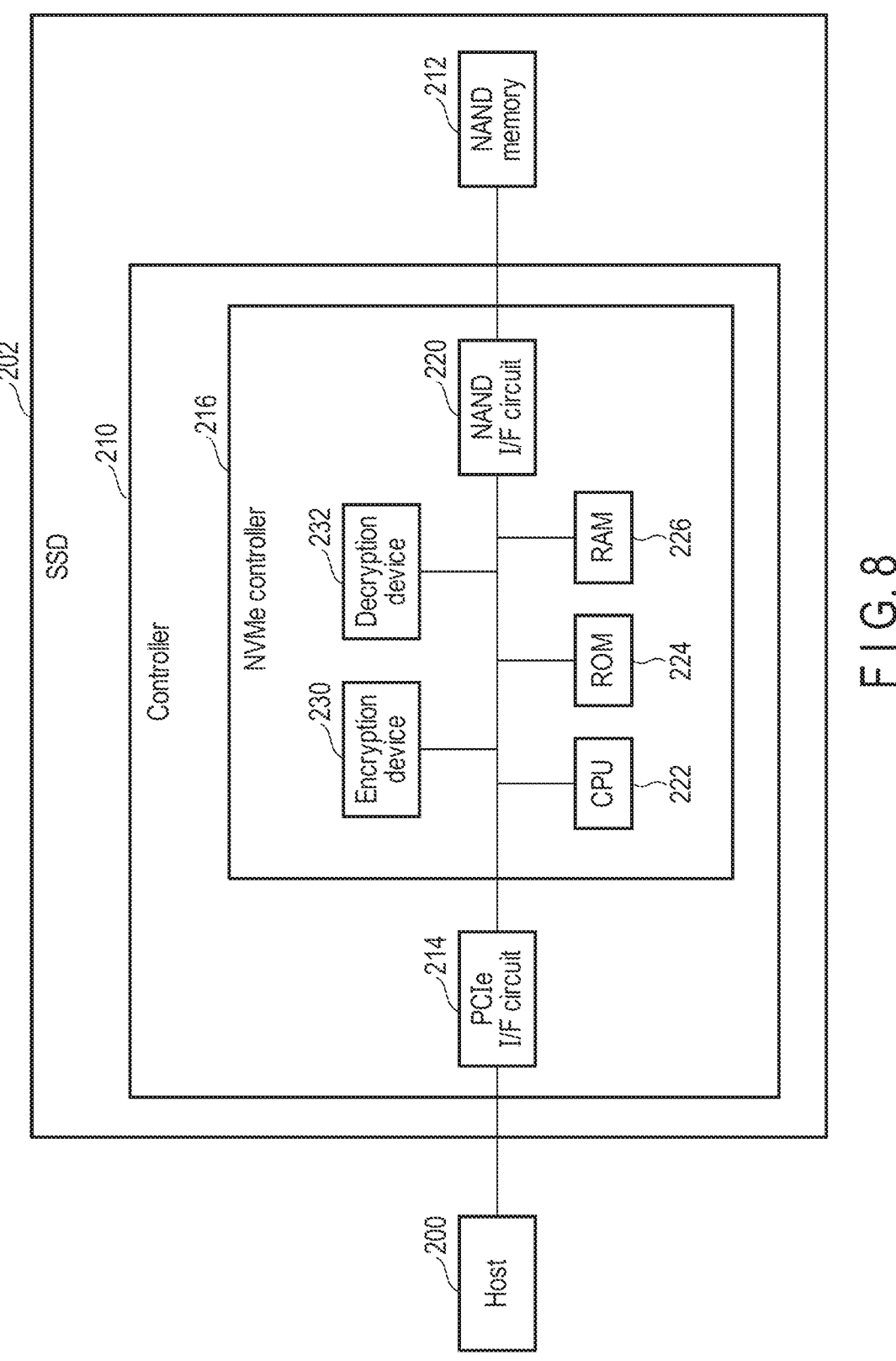
F I G. 8

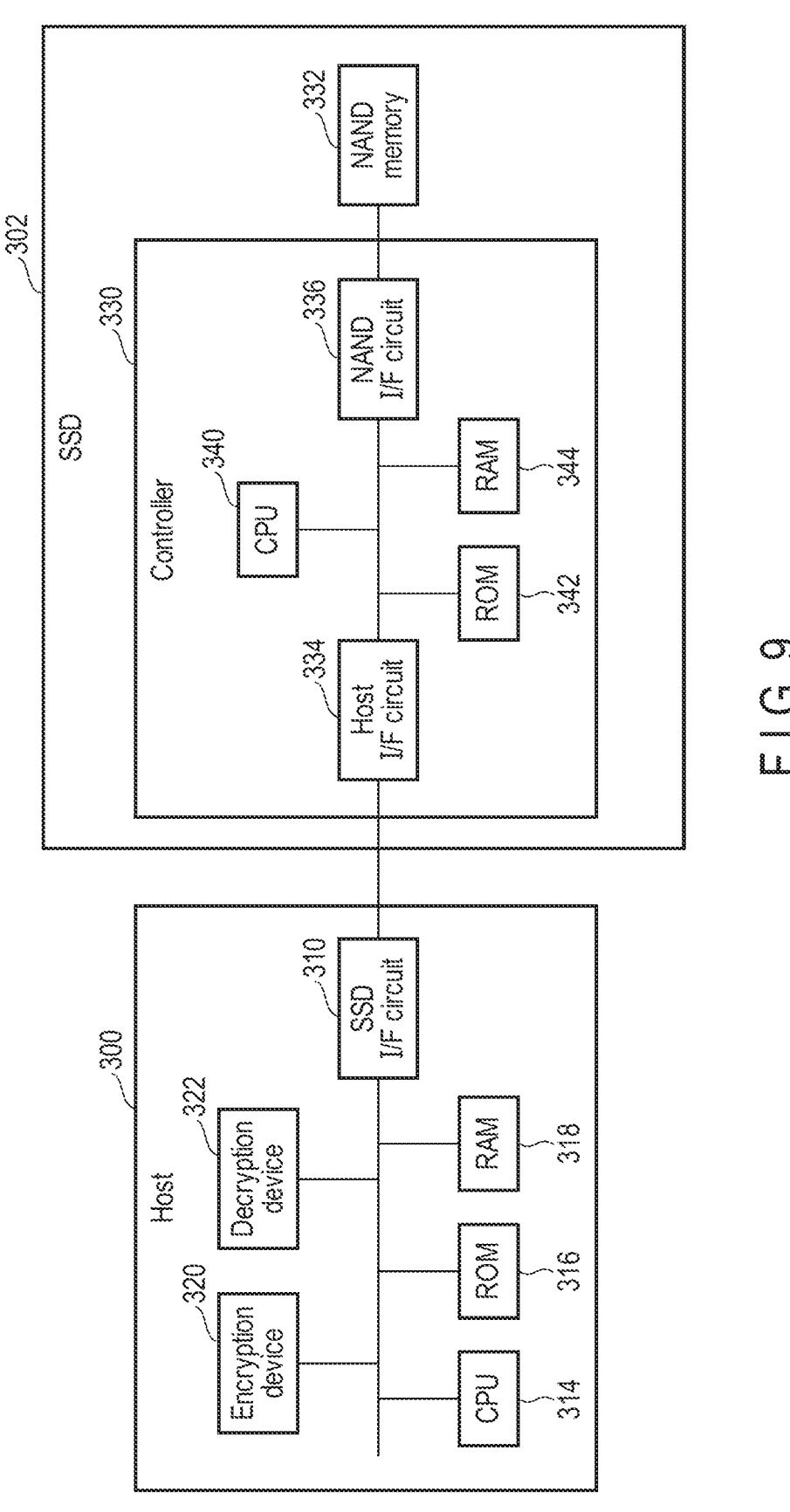
F I G. 9

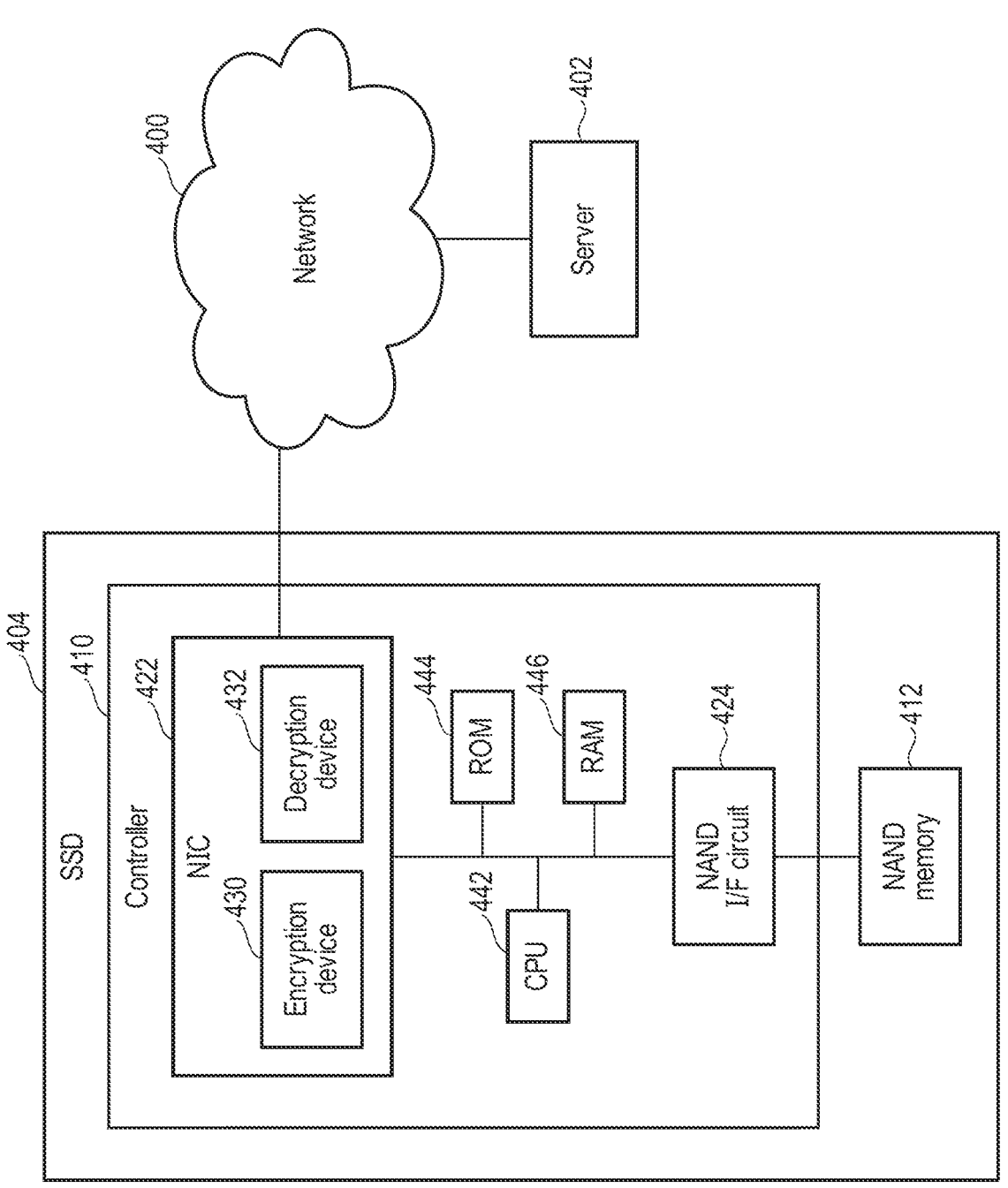
F I G. 10

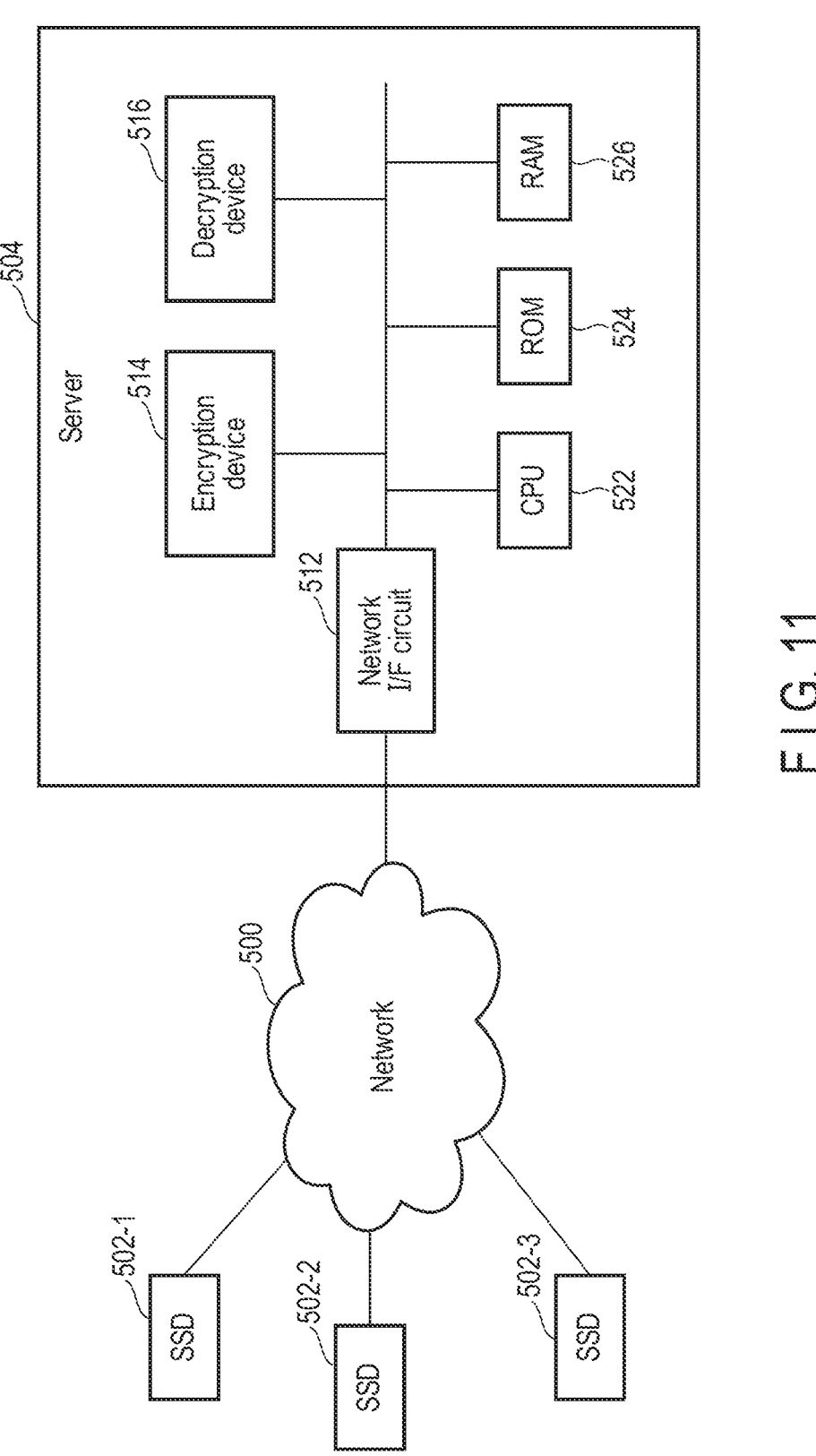
F I G. 11

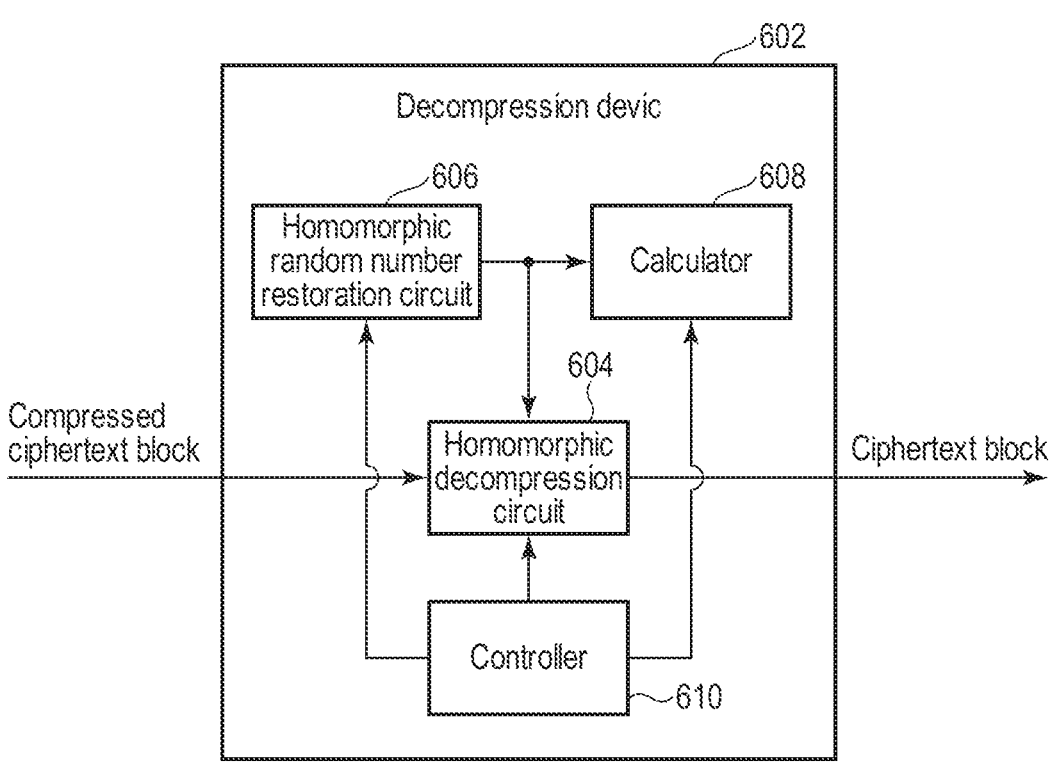
F I G. 12
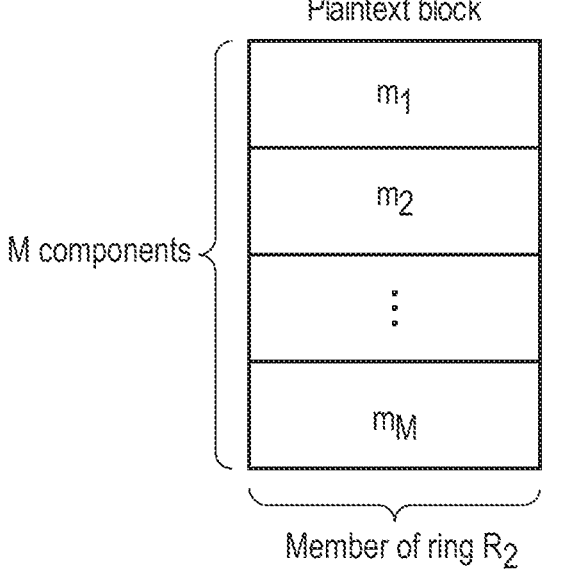
F I G. 13

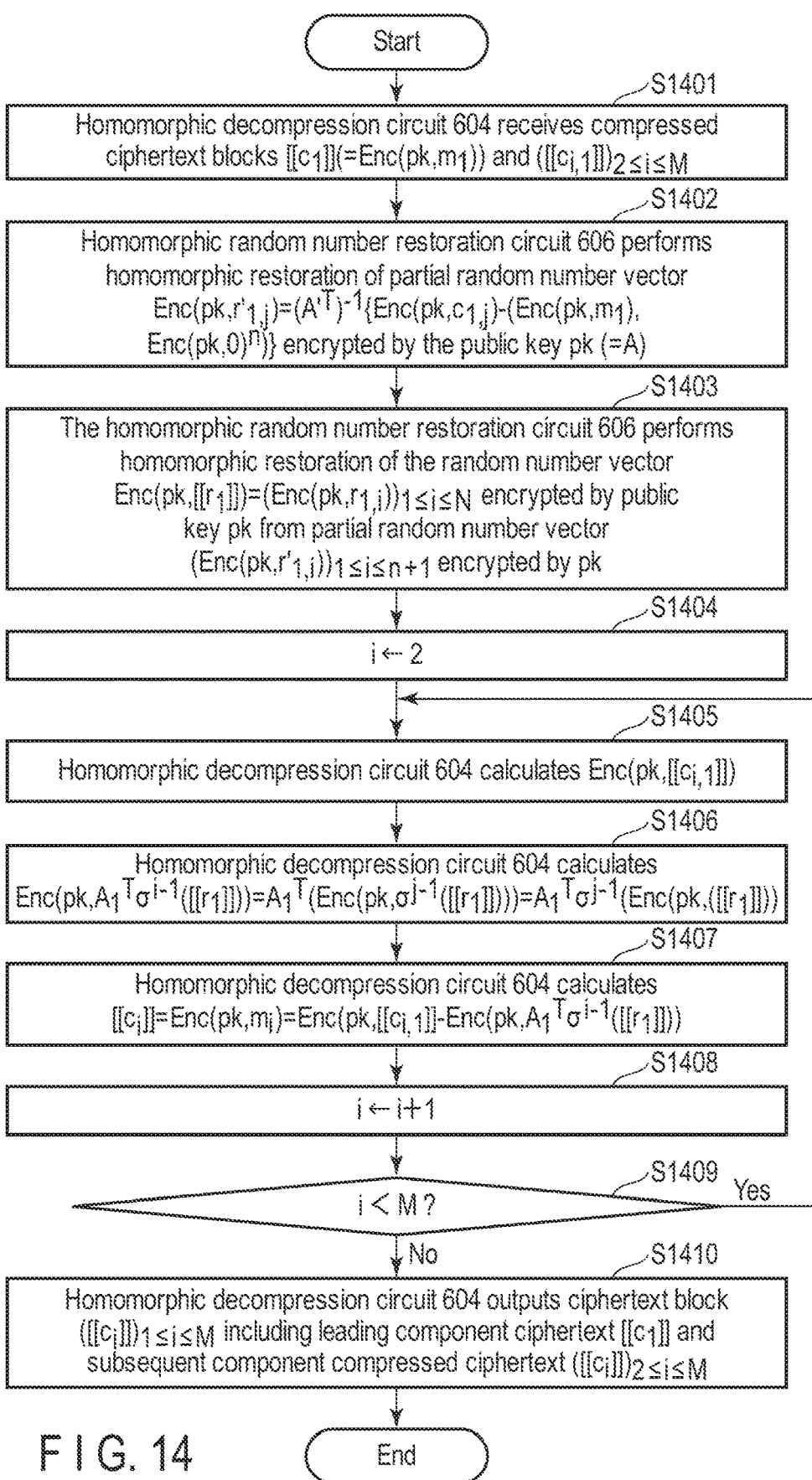

Start

S1401

Homomorphic decompression circuit 604 receives compressed ciphertext blocks $[[c_1]](=Enc(pk,m_1))$ and $([[c_{i,1}]])_{2\leq i\leq M}$

S1402

Homomorphic random number restoration circuit 606 performs homomorphic restoration of partial random number vector $Enc(pk,r'_{1,j})=(A'^T)^{-1}\{Enc(pk,c_{1,j})-(Enc(pk,m_1),\ Enc(pk,0)^n)\}$ encrypted by the public key pk $(=A)$

S1403

The homomorphic random number restoration circuit 606 performs homomorphic restoration of the random number vector $Enc(pk,[[r_1]])=(Enc(pk,r_{1,i}))_{1\leq i\leq N}$ encrypted by public key pk from partial random number vector $(Enc(pk,r'_{1,i}))_{1\leq i\leq n+1}$ encrypted by pk

S1404

$i \leftarrow 2$

S1405

Homomorphic decompression circuit 604 calculates $Enc(pk,[[c_{i,1}]])$

S1406

Homomorphic decompression circuit 604 calculates $Enc(pk,A_1{}^T\sigma^{i-1}([[r_1]]))=A_1{}^T(Enc(pk,\sigma^{i-1}([[r_1]])))=A_1{}^T\sigma^{i-1}(Enc(pk,([[r_1]]))$

S1407

Homomorphic decompression circuit 604 calculates $[[c_i]]=Enc(pk,m_i)=Enc(pk,[[c_{i,1}]])-Enc(pk,A_1{}^T\sigma^{i-1}([[r_1]]))$

S1408

$i \leftarrow i+1$

S1409

$i < M?$          Yes

No          S1410

Homomorphic decompression circuit 604 outputs ciphertext block $([[c_i]])_{1\leq i\leq M}$ including leading component ciphertext $[[c_1]]$ and subsequent component compressed ciphertext $([[c_i]])_{2\leq i\leq M}$ End

F I G. 14

| | | | | |
|---|---|---|---|---|
| $[[c_{1,1}]]$ $= m_1 + A_1^T [[r_1]]$ | $[[c_{1,2}]]$ $= A_2^T [[r_1]]$ | $[[c_{1,3}]]$ $= A_3^T [[r_1]]$ | $\cdots$ | $[[c_{1,n+1}]]$ $= A_{n+1}^T [[r_1]]$ |
| $[[c_{2,1}]]$ $= m_2 + A_1^T [[r_2]]$ | $[[c_{2,2}]]$ $= A_2^T [[r_2]]$ | $[[c_{2,3}]]$ $= A_3^T [[r_2]]$ | $\cdots$ | $[[c_{2,n+1}]]$ $= A_{n+1}^T [[r_2]]$ |
| $\cdots$ | $\cdots$ | $\cdots$ | $\cdots$ | $\cdots$ |
| $[[c_{M,1}]]$ $= m_M + A_1^T [[r_M]]$ | $[[c_{M,2}]]$ $= A_2^T [[r_M]]$ | $[[c_{M,3}]]$ $= A_3^T [[r_M]]$ | $\cdots$ | $[[c_{M,n+1}]]$ $= A_{n+1}^T [[r_M]]$ |

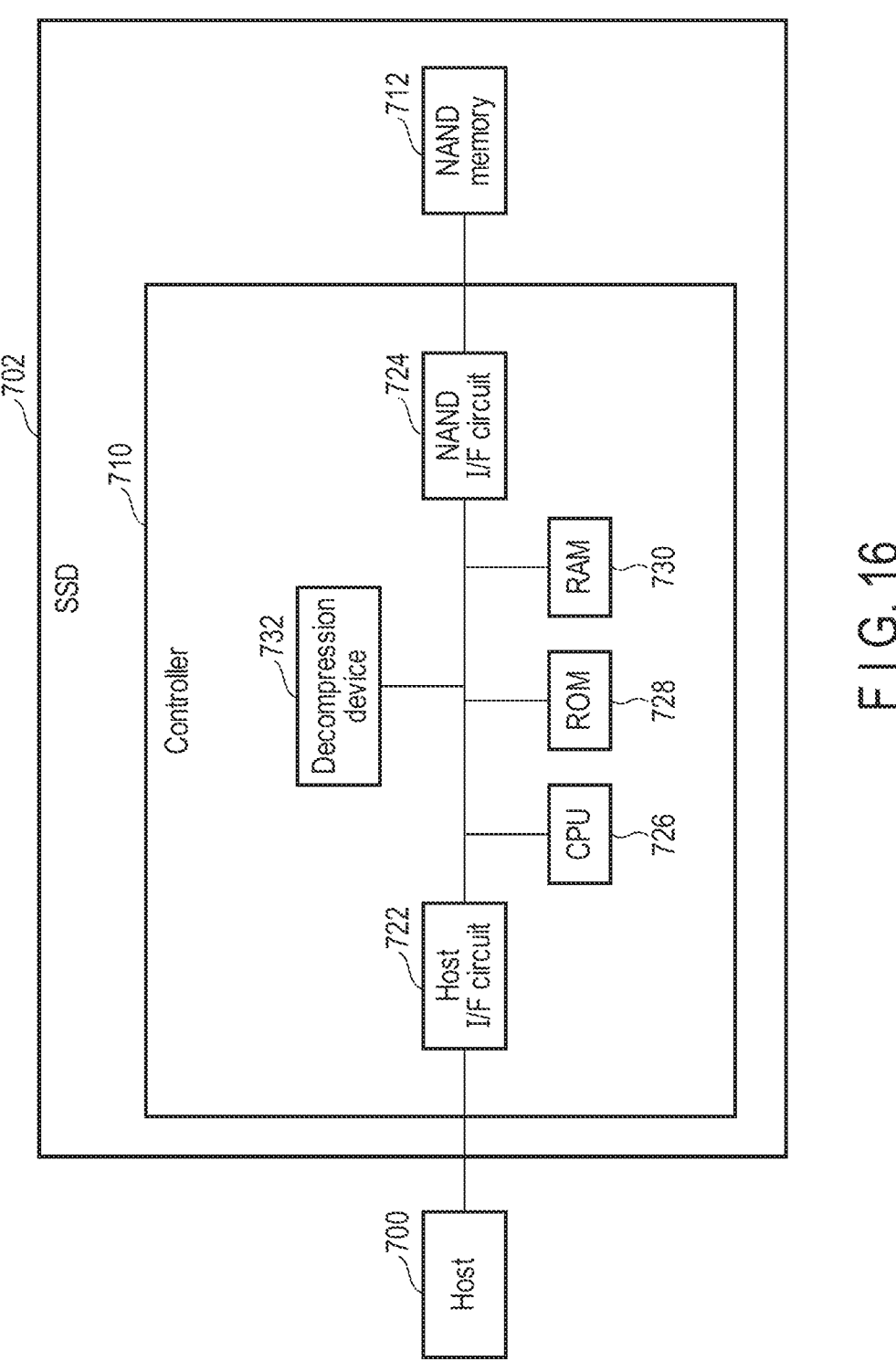
F I G. 16

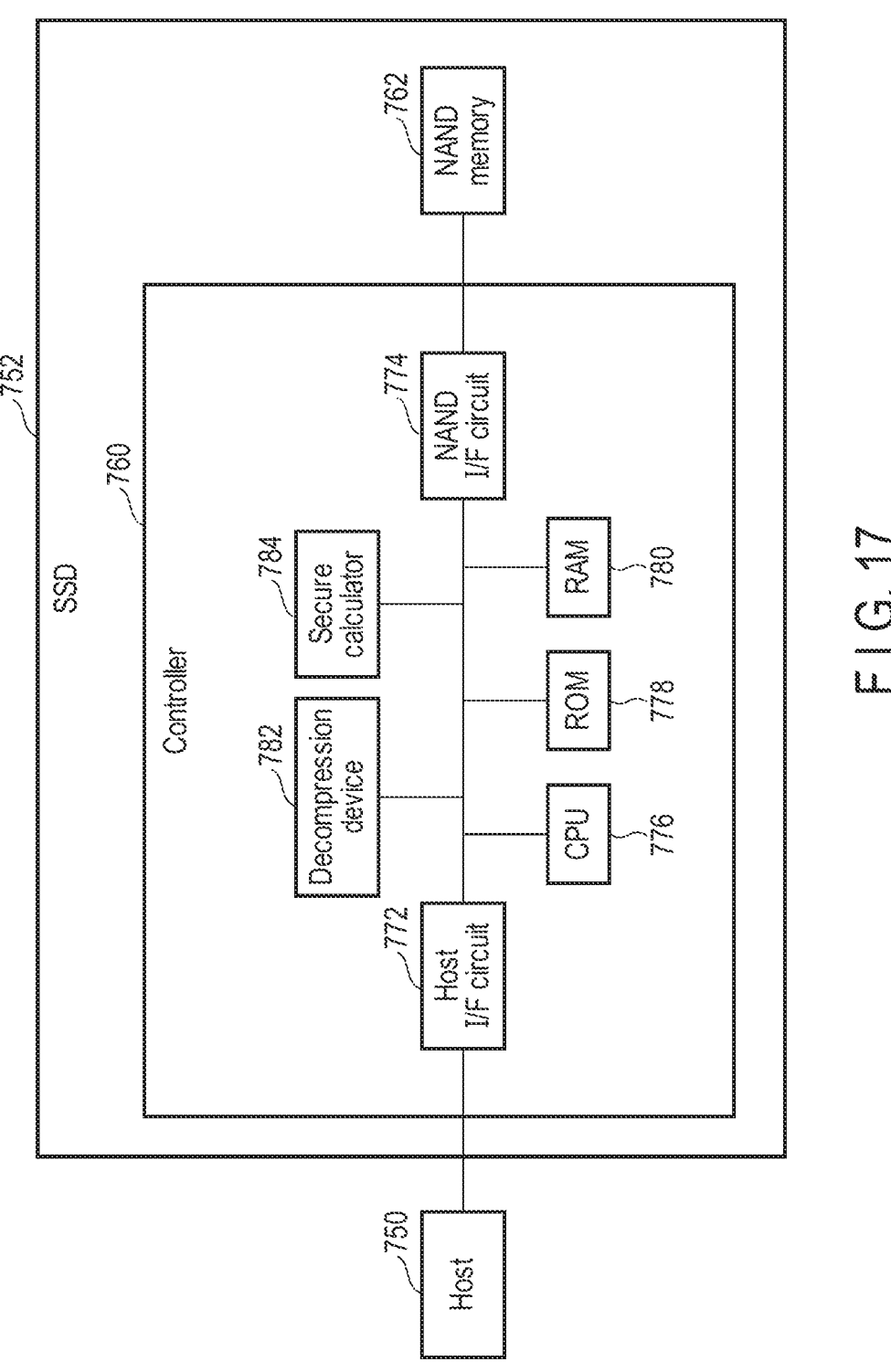
F I G. 17

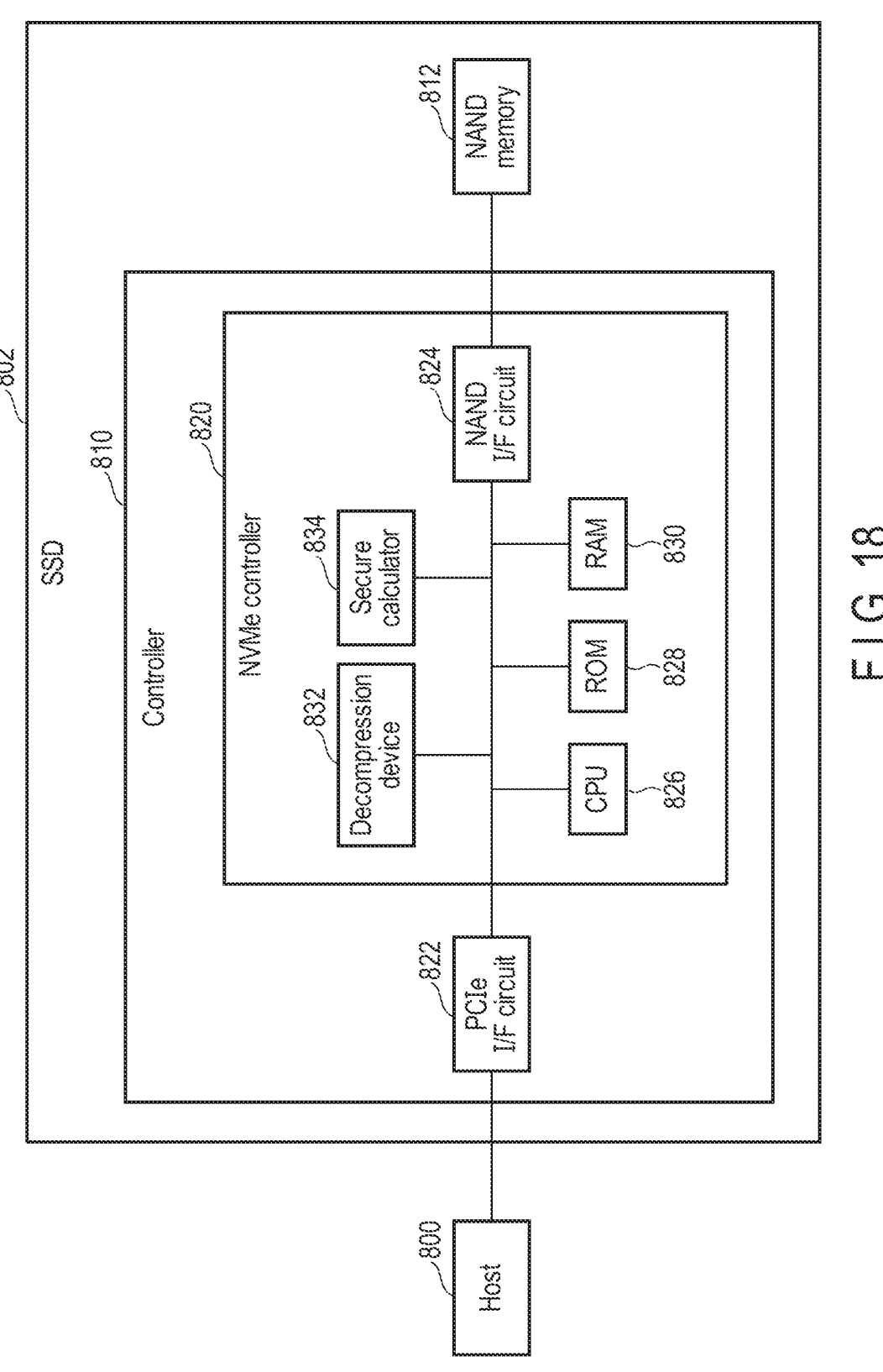
F I G. 18

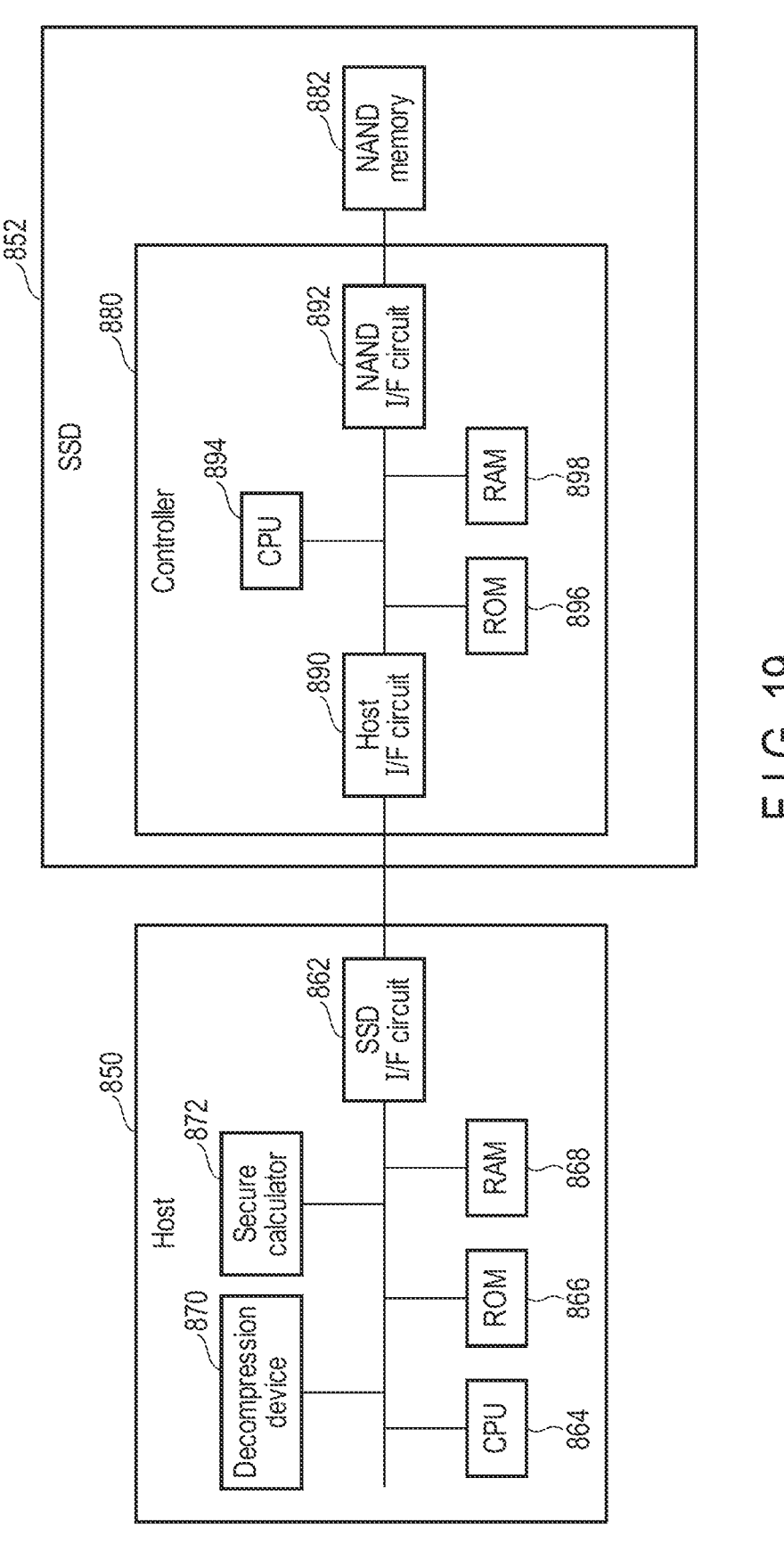
F I G. 19

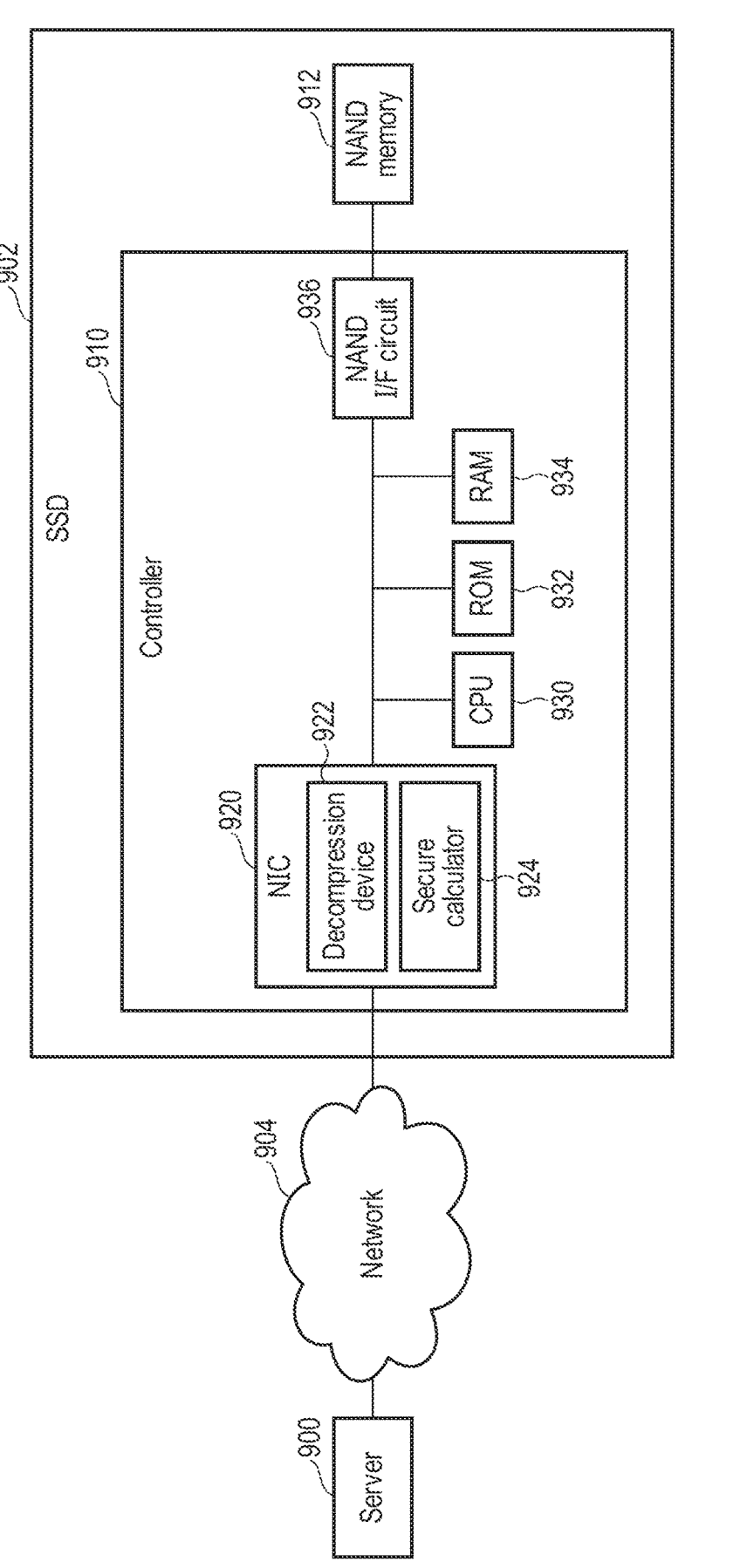
F I G. 20

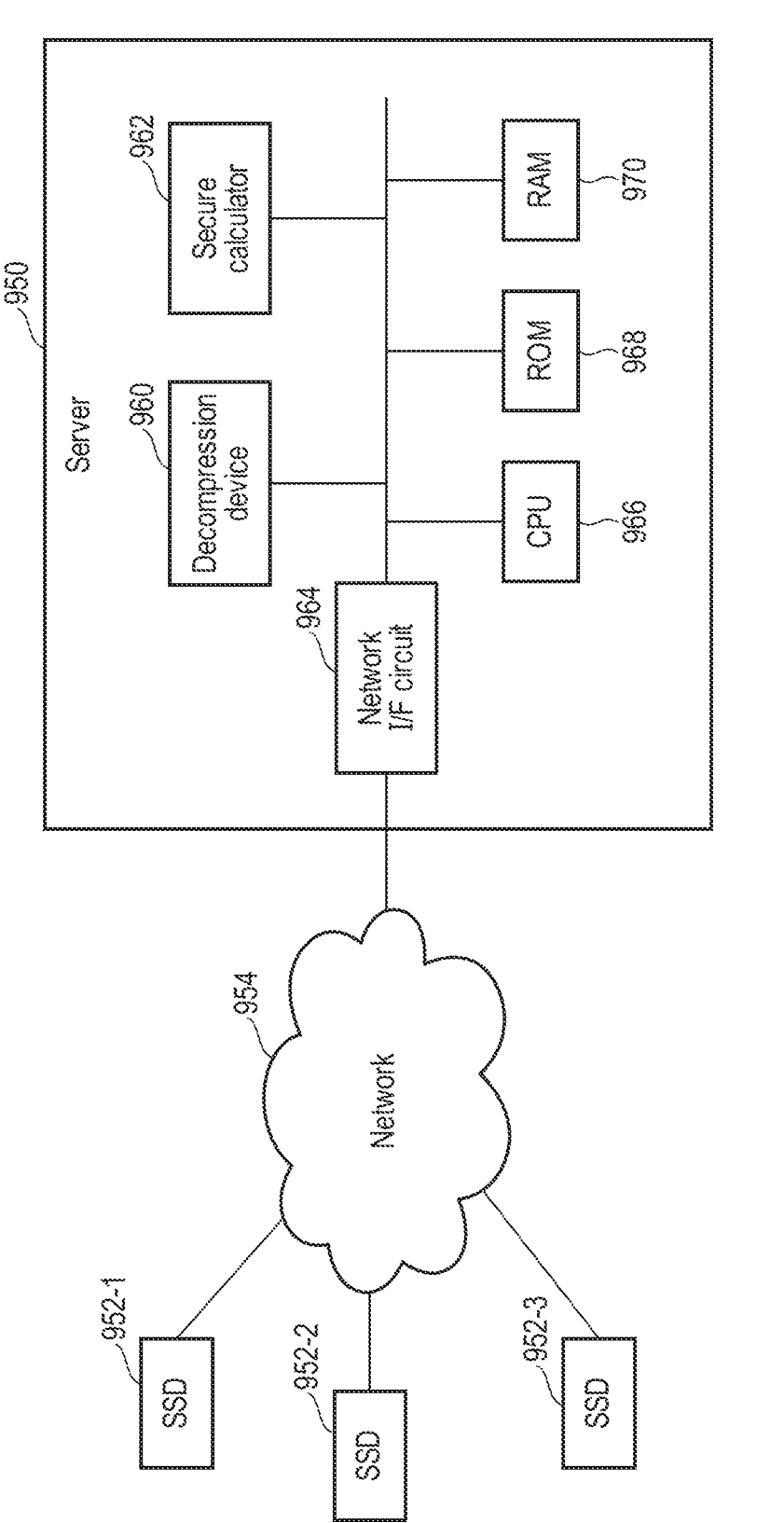
F I G. 21

ENCRYPTION DEVICE, DECRYPTION DEVICE, STORAGE SYSTEM, INFORMATION PROCESSING DEVICE, ENCRYPTION METHOD, DECRYPTION METHOD, DECOMPRESSION DEVICE, AND DECOMPRESSION METHOD

CROSS-REFERENCE TO RELATED APPLICATIONS

This application is based upon and claims the benefit of priority from Japanese Patent Application No. 2022-090731, filed Jun. 3, 2022; and No. 2023-044386, filed Mar. 20, 2023, the entire contents of all of which are incorporated herein by reference.

FIELD

Embodiments described herein relate generally to an encryption device, a decryption device, a storage system, an information processing device, an encryption method, a decryption method, a decompression device, and a decompression method.

BACKGROUND

In encryption based on the lattice field theory (hereinafter referred to as lattice encryption), ciphertext compression has been proposed. As an example, ciphertext compression for changing a divisor for use in a ciphertext has been proposed. If the relationship between divisor q for use in the ciphertext before compression and divisor q' for use in the ciphertext after compression is q'<q, the bit width required to encode one symbol of the ciphertext can be decreased. This reduces the size of the ciphertext and compresses the ciphertext.

However, if q' is smaller than q (q'<q), among q types of ciphertext symbol, (q-q') types of ciphertext symbol will not be decrypted correctly. That is, this compression is not reversible compression.

BRIEF DESCRIPTION OF THE DRAWINGS

FIG. 3 is a flowchart illustrating an example of the encryption process of the encryption device according to the first embodiment.

FIG. 4 is a diagram illustrating an example of the compressed ciphertext block according to the first embodiment.

FIG. 5 is a block diagram illustrating an example of a decryption device according to a second embodiment.

FIG. 6 is a flowchart illustrating an example of the decryption process of the decryption device according to the second embodiment.

FIG. 7 is a block diagram illustrating an example of a storage system according to a third embodiment.

FIG. 8 is a block diagram illustrating an example of a storage system according to a fourth embodiment.

FIG. 9 is a block diagram illustrating an example of an information processing system according to a fifth embodiment.

FIG. 10 is a block diagram illustrating an example of a storage system according to a sixth embodiment.

FIG. 11 is a block diagram illustrating an example of an information processing system according to a seventh embodiment.

FIG. 12 is a block diagram illustrating an example of a decompression device according to an eighth embodiment.

FIG. 13 is a diagram illustrating an example of a plaintext block according to the eighth embodiment.

FIG. 14 is a flowchart illustrating an example of the decompression process of the decompression device according to the eighth embodiment.

FIG. 15 is a diagram illustrating an example of the compressed ciphertext block according to the eighth embodiment.

FIG. 16 is a block diagram illustrating an example of a storage system according to a ninth embodiment.

FIG. 17 is a block diagram illustrating an example of a storage system according to a tenth embodiment.

FIG. 18 is a block diagram illustrating an example of a storage system according to an eleventh embodiment.

FIG. 19 is a block diagram illustrating an example of an information processing system according to a twelfth embodiment.

FIG. 20 is a block diagram illustrating an example of a storage system according to a thirteenth embodiment.

FIG. 21 is a block diagram illustrating an example of a storage system according to a fourteenth embodiment.

DETAILED DESCRIPTION

Figure 1:
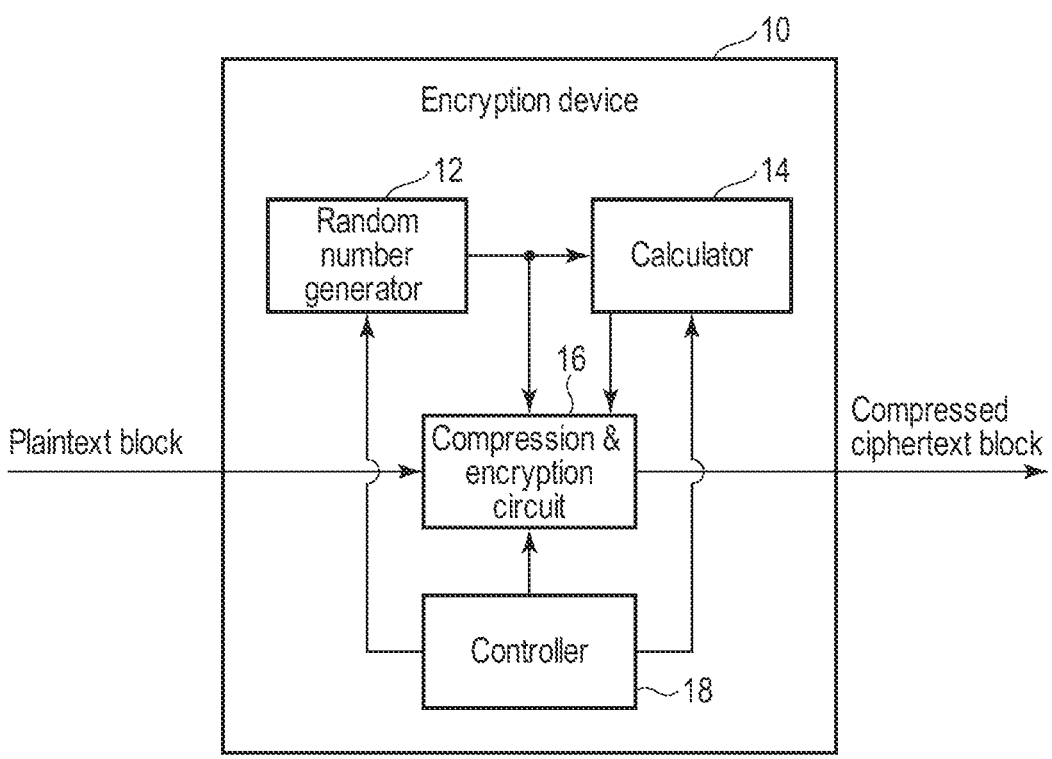
FIG. 1 is a block diagram illustrating an example of an encryption device according to a first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an encryption device which is able to encrypt a plaintext block including a leading component and subsequent components and generate a leading component ciphertext corresponding to the leading component and subsequent component ciphertexts corresponding to the subsequent components. The leading component ciphertext includes a leading subcomponent and a subsequent subcomponent. Each of the subsequent component ciphertexts includes a leading subcomponent and a subsequent subcomponent. The encryption device comprises a generator configured to generate an (n+1)-dimensional primary independent partial random number vector and generate an N-dimensional random number vector from the partial random number vector; a calculator configured to calculate a value of a predetermined function for the random number vector a predetermined number of times; and an encryption circuit configured to encrypt the leading component by a public key of N rows and (n+1) columns having an (n+1)-dimensional regular submatrix and the N-dimensional random number vector to generate the leading component ciphertext, and encrypt each of the subsequent components by the public key and an output of the calculator to generate the subsequent component ciphertexts. Each of the subsequent component ciphertexts includes a leading subcomponent ciphertext and includes no subsequent subcomponent ciphertext. n and N are positive integers; and (n+1) is smaller than N.

First Embodiment

FIG. 1 is a block diagram illustrating an example of an encryption device 10 according to a first embodiment. The encryption device 10 includes a random number generator 12, an calculator 14, a compression and encryption circuit 16, and a controller 18. The random number generator 12, calculator 14, compression and encryption circuit 16, and controller 18 may be implemented by hardware such as a dedicated electrical circuit (for example, a silicon on a chip (SoC)) or by programs (software) to be executed by a processor (not shown).

The random number generator 12 generates an (n+1)-dimensional primary independent partial random number vector that is part of an N-dimensional random number vector. The random number generator 12 also generates an N-dimensional random number vector from the partial random number vector. Letters n and N denote positive integers, and (n+1) is smaller than N. The random number generator 12 outputs a random number vector to the calculator 14 and the compression and encryption circuit 16.

The calculator 14 calculates a value of a predetermined function $\sigma$ for the random number vector a predetermined number of times. The calculator 14 outputs a result of the calculations to the compression and encryption circuit 16.

The compression and encryption circuit 16 receives a plaintext block from outside to compress and encrypt the plaintext block. The compression and encryption circuit 16 outputs a compressed ciphertext block.

Figure 2:
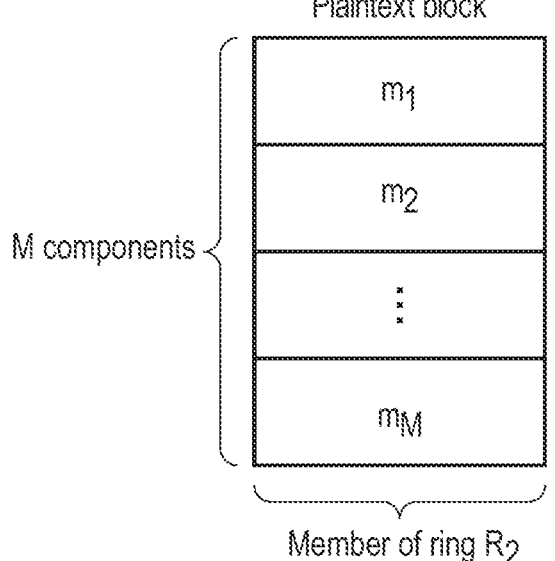
FIG. 2 is a diagram illustrating an example of a plaintext block according to the first embodiment.

FIG. 2 is a diagram illustrating an example of a plaintext block to be input to the encryption device 10 according to the first embodiment. The plaintext block includes M time-series components $m_1, m_2 \ldots m_M$. M is larger than 1 (M>1). Each of the components $m_1, m_2 \ldots m_M$ is a member of ring $R_2$.

The compression and encryption circuit 16 performs different encryption for the leading component $m_1$ located at the head of a plaintext block and components $m_2 \ldots m_M$ subsequent to the leading component $m_1$.

The compression and encryption circuit 16 encrypts the leading component $m_1$ by a public key and a random number vector to generate a leading component ciphertext including (n+1) ciphertexts.

The compression and encryption circuit 16 encrypts each of the subsequent components $m_2 \ldots m_M$ by a public key and the output of the calculator 14. The compression and encryption circuit 16 generates a subsequent component ciphertext including (M−1) ciphertexts.

The subsequent component ciphertext includes a list of leading sub-component ciphertexts only and not subsequent sub-component ciphertexts. Therefore, the number of sub-components concerning ciphertexts included in the subsequent component ciphertext is smaller than the number of subcomponents included in the plaintext block. Hereafter, the subsequent component ciphertext will be referred to as a subsequent component compressed ciphertext.

The compression and encryption circuit 16 outputs a compressed ciphertext block including a leading component ciphertext and a list of subsequent component compressed ciphertexts to the outside.

The controller 18 controls the operation timings of the random number generator 12, calculator 14, and compression and encryption circuit 16.

The encryption process of the encryption device 10 will be described. The encryption device 10 utilizes lattice-based cryptography. The lattice-based cryptography is cipher constructed using a lattice. The lattice is a set of vectors that can be represented by an integer linear combination of basis vectors. N row vectors or random number vectors of a public key are members of one lattice. A variety of lattice encryption algorithms are put into practical use. The encryption device 10 can use any lattice encryption algorithm. As an example of the lattice encryption algorithm, the BGV scheme will be described. An example of the BGV scheme is described in the following paper.

Zvika Brakerski, Craig Gentry, Vinod Vaikuntanathan, "(Leveled) Fully Homomorphic Encryption without Bootstrapping", ACM Transactions on Computation Theory, Volume 6, Issue 3, July 2014.

In the BGV scheme, ring R is equal to $Z[X]/(X^d+1)$, ring Rq is equal to R/qR, d is a power of 2, Z is a set of integers, and Z[X] is a set of integer coefficient polynomials. A/B represents a coset by subgroup B of group A. Ring Rq is a coset by divisor q of ring R. If, for example, ring R is a set of integer coefficient polynomials and q is equal to 2, then ring Rq is equivalent to a set of integer polynomials with a coefficient of 0 or 1, and qR is a set of values obtained by multiplying each member of ring R by q.

In general, the members of ring Rq are represented by a d-dimensional integer vector. If d is equal to 1, the members of the ring Rq can be handled as scalars.

The private key includes a vector of the (n+1)-dimensional ring Rq. If n is larger than 2 and d is equal to 1, the lattice-based cryptography is called learning with errors (LWE). If n is equal to 1 and d is larger than 1, the lattice-based cryptography is called Ring LWE. In the case of LWE, R is equal to Z.

The configurations of the private key, public key, random number vector, leading component ciphertext, list of subsequent component compressed ciphertexts, and function $\sigma$ in the encryption process according to the first embodiment will be described.

Private Key

Private key [[s]] is represented by Equations (1) and (2). In the present specification, symbol [[ ]] represents a vector.

$$[[s]]=(1,[[t]])\in Rq^{n+1} \tag{1}$$

$$[[t]]\in Rq^n \leftarrow \chi^n \tag{2}$$

$\chi$ is probability distribution (Gaussian distribution, uniform distribution, etc.) on ring Rq.

Public Key

Public key $A\in Rq^{N(n+1)}$ is represented by Equations (3) to (6) using [[t]] included in the private key [[s]].

$$A=([[b]],B) \tag{3}$$

$$[[b]]=B[[t]]+2[[e]] \tag{4}$$

$$[[e]]\leftarrow\chi^N \tag{5}$$

$$B\in Rq^{Nn}\leftarrow U^{Nn} \tag{6}$$

U is a uniform distribution on ring Rq.

Public key A is an N-row and (n+1)-column matrix with (n+1)-dimensional regular submatrices. The regular submatrix A' including (n+1) specific row vectors among the N row vectors of the public key A is configured to have an inverse matrix. In the first embodiment, A' is defined as (n+1) leading row vectors of the public key A. In this case, the i-th row of the (n+1)-dimensional regular submatrix matches the i-th row of the public key.

Random Number Vector [[r1]]

An example of how to generate a random number vector $[[r1]] \in R2^N$ from partial random number vector $[[r'1]] \in R2^{n+1}$ will be described.

$$b=(b_{ij})1 \leq i \leq N-(n+1), 1 \leq j \leq (n+1) \qquad (7)$$

Each component $b_{i,j} \in R2$ of b will be defined as a constant.

The i-th component $r_{1,i}$ of the random number vector $[[r1]]$ is obtained as given by Equation (8). In Equation (8), $r'_{1,i}$ is the i-th component of the partial random number vector $[[r'1]]$.

$$r_{1,i} = \begin{cases} r'_{1,i} & 1 \leq i \leq n+1 \\ \sum_{j=1}^{n+1} b_{i-(n+1),j} \cdot r'_{1,i} & n+1 < i \leq N \end{cases} \qquad (8)$$

In a case of $1 \leq i \leq n+1$, the i-th component of the random number vector coincides with the i-th component of the partial random number vector.

Leading Component Ciphertext

The leading component ciphertext $[[c1]] \in Rq^{n+1}$ is generated from the leading component $m_1$, public key A, and random number vector $[[r1]]$ as given by Equation (9).

$$[[c1]]=(m_1,0^n)+A^T[[r1]] \qquad (9)$$

In Equation (9), $0^n$ represents a sequence of zero elements of R the number of which is n. $A^T$ represents a transposed matrix of A.

Subsequent Component Compressed Ciphertext

The i-th component $[[c_{i,1}]]$ of a list of subsequent component compressed ciphertexts $([[c_{i,1}]])_{2 \leq i \leq M}$ is generated as given by Equation 10.

$$[[c_{i,1}]]=m_i+A_1{}^{T \circ i-1}([[r1]]) \qquad (10)$$

In Equation (10), $A_1$ represents a leading row of public key A, $\sigma^{i-1}$ represents calculation to be performed (i−1) times by function $\sigma$, and $\sigma^{i-1}$ ($[[r1]]$) is equal to $[[ri]]$.

Function $\sigma$

Various functions can be utilized as function $\sigma$ to be used by the calculator 14.

When M is equal to or smaller than N, a bit-rotation function can be used as function $\sigma$. In this case, $\sigma(r)$ is equal to $(r>>1)|(r<<N-1)$ (right rotation) or $\sigma(r)$ is equal to $(r<<1)|(r>>N-1)$ (left rotation). The symbol $>>$ represents a right bit shift operator, the symbol $<<$ represents a left bit shift operator, and the symbol | represents a bit OR operator.

As function $\sigma$, a one-way function can be used. In this case, $\sigma(r)$ is equal to $H(r)$. H is a hash function or a cryptographic hash function.

If M is equal to or smaller than N ($M \leq N$), a permutation function can be used as function $\sigma$. If $\sigma$ is a permutation function, there is only one $x \in \{0,1\}^N$ where $y=\sigma(x)$ for every $y \in \{0,1\}^N$.

FIG. 3 is a flowchart illustrating an example of the encryption process of the encryption device 10 according to the first embodiment.

First, the controller 18 operates the compression and encryption circuit 16. The compression and encryption circuit 16 receives a plaintext block $(m_i)_{1 \leq i \leq M} \in R_2{}^M$ from outside (S301).

Then, the controller 18 operates the random number generator 12. The random number generator 12 generates a partial random number vector $[[r'_1]] \in R_2{}^{n+1}$ (S302). The random number generator 12 also generates a random number vector $[[r_1]] \in R_2{}^M$ from the partial random number vector $[[r'_1]]$ according to Equation (8) (S303), where n+1 is smaller than M (n+1<M).

Then, the controller 18 operates the compression and encryption circuit 16. In accordance with Equation (9), the compression and encryption circuit 16 generates a leading component ciphertext $[[c_1]]=(m_1,0^n)+A^T[[r1]]$ for the leading component $m_1$ of the plaintext block (S305).

The controller 18 sets the loop control variable i to 2 (S306).

Then, the controller 18 operates the compression and encryption circuit 16. In accordance with Equation (10), the compression and encryption circuit 16 generates an i-th component $[[c_{i,1}]]=m_i+A_1{}^{T \circ i-1}([[r_1]])$ of the subsequent component compression ciphertext for the subsequent component $m_i$ of the plaintext block (S307). The subsequent component compressed ciphertext includes a ciphertext of the leading subcomponent of the subsequent component $m_i$ of the plaintext block and does not include a ciphertext of the subcomponents other than the leading subcomponent of the subsequent component $m_i$.

The controller 18 increments the loop control variable i by one (S308).

The controller 18 determines whether i is smaller than M (i<M) (S309). If i is smaller than M (i<M) (Yes in S309), the controller 38 executes the process after S307. In accordance with Equation (10), the compression and encryption circuit 16 generates an i-th component $[[c_{i,1}]]$ of the subsequent component compression ciphertext for the subsequent component $m_i$ of the plaintext block (S307).

If i is equal to or larger than M (i≥M) (No in S309), the controller 18 operates the compression and encryption circuit 16 (S310). The compression and encryption circuit 16 outputs to the outside a compressed ciphertext block including the leading component ciphertext $[[c_1]]$ generated in S305 and the subsequent component compressed ciphertext list $([[c_{i,1}]])_{2 \leq i \leq M}$ generated in S307 (S310). After that, the encryption process ends.

FIG. 4 is a diagram illustrating an example of the layout of the compressed ciphertext block according to the first embodiment. Each of the rows in FIG. 4 corresponds to the ciphertext of each component of the plaintext block shown in FIG. 2.

According to the encryption device of the first embodiment, the leading component ciphertext $[[c_1]]$ for the leading component $m_1$ includes the ciphertexts $[[c_{1,1}]], [[c_{1,2}]] \ldots [[c_{1,n+1}]]$ of the (n+1) subcomponents in the uppermost row enclosed by the bold frame in FIG. 4. The subsequent component compressed ciphertext list $([[c_{i,1}]])_{2 \leq i \leq M}$ for the subsequent component $m_i$ includes only ciphertexts $[[c_{2,1}]] \ldots [[c_{M,1}]]$ of the leading subcomponents in the leftmost column enclosed by the bold frame in FIG. 4. The subsequent component compressed ciphertext list $([[c_{i,1}]])_{2 \leq i \leq M}$ does not include the ciphertexts $[[c_{2,2}]] \ldots [[c_{2,n+1}]]; \ldots; [[c_{M,2}]] \ldots [[c_{M,n+1}]]$ (ciphertexts enclosed by the broken frame in FIG. 4) of the subcomponents other than the leading subcomponent. This reduces the number of ciphertexts in a lattice cipher text block from M×(n+1) to M+n, thus decreasing the size of the ciphertext block.

Since the public key A is a matrix of N rows and (n+1) columns with the (n+1)-dimensional regular submatrix, a regular submatrix A' including specific (n+1) row vectors among the N row vectors of the public key A is configured to have an inverse matrix. It is thus possible to restore a partial random number vector using the inverse matrix of the partial matrix A' according to Equation (12) (to be described later), and to restore a random number vector from the restored partial random number vector by Equation (8). A decryption device decrypts the ciphertexts $[[c_{2,2}]]$ . . . $[[c_{2,n+1}]]$; . . . ; $[[c_{M,2}]]$ . . . $[[c_{M,\ n+1}]]$ corresponding to subcomponents other than the leading subcomponent of the subsequent component compressed ciphertext which are not included in the compressed ciphertext block.

The encryption device 10 according to the first embodiment can be implemented in an SSD controller, a network interface card, an NVMe™ controller, a cloud server, a client PC, and the like. Examples of the implementation will be described in the third to seventh embodiment.

Second Embodiment

FIG. 5 is a block diagram illustrating an example of a decryption device 30 according to a second embodiment. The decryption device 30 includes a random number restoration circuit 32, a calculator 34, a decompression and decryption circuit 36, and a controller 38. The random number restoration circuit 32, calculator 34, decompression and decryption circuit 36, and controller 38 may be implemented by hardware such as an electrical circuit (for example, SoC) or by programs (software) to be executed by a processor (not shown).

The random number restoration circuit 32 restores an N-dimensional random number vector from the leading component ciphertext of a plaintext block and a public key. The random number restoration circuit 32 outputs the random number vector to the calculator 34 and decompression and decryption circuit 36.

The calculator 34 calculates a value of the predetermined function σ for the random number vector a predetermined number of times. The calculator 34 outputs a result of the calculation to the decompression and decryption circuit 36.

The decompression and decryption circuit 36 receives from outside a compressed ciphertext block including a leading component ciphertext and a subsequent component compressed ciphertext list. The decompression and decryption circuit 36 performs different decryption operations on the leading component ciphertext and the subsequent component compressed ciphertext list. An example of the compressed ciphertext block received by the decompression and decryption circuit 36 is the ciphertext block shown in FIG. 4.

The decompression and decryption circuit 36 performs a decryption operation by a private key corresponding to the public key on the leading component ciphertext to decrypt a leading component of the plaintext block from the leading component ciphertext.

By the public key and the output of the calculator 34, the decompression and decryption circuit 36 restores the ciphertext of a subsequent subcomponent from the ciphertext of the leading subcomponent of each subsequent component compressed ciphertext included in the subsequent component compressed ciphertext list. The decompression and decryption circuit 36 performs a decryption operation by a private key on the subsequent component compressed ciphertext including the received subsequent component compressed ciphertext list and the ciphertext of the restored subsequent subcomponent. The decompression and decryption circuit 36 decrypts the subsequent components of the plaintext block from the subsequent component compressed ciphertext.

The controller 38 controls the operation timing of the random number restoration circuit 32, calculator 34, and decompression and decryption circuit 36.

Below are descriptions of a method for decrypting a plaintext block, a method for restoring a partial random number vector, a method for restoring a random number vector, and a method for restoring a subsequent component compressed ciphertext in the decryption process according to the second embodiment.

Method for Decrypting Plaintext Block

The i-th component $m_i$ of the plaintext block is decrypted from the i-th component $[[c_i]]$ of the ciphertext block by the private key $[[s]]$ as given by Equation (11).

$$m_i=[[<[[c_i]],[[s]]>]_q]_2 \qquad (11)$$

The symbol $<[[a]],[[b]]>$ represents the inner product of vectors a and b. The symbol $[x]_a$ represents the value of (x mod a) in a section $(-a/2, a/2]$.

Restoration of Partial Random Number Vector

The partial random number vector $[[r'1]]\in R2^{n+1}$ is restored from the submatrix A' of the public key A corresponding to (n+1) primary independent components of the random number vector $[[r1]]\in R2^M$, the leading component ciphertext $[[c1]]$, and the leading component $m_1$ of the plaintext block, as given by Equation (12).

$$[[r'_1]]=(A'^T)^{-1}([[c_1]]-(m_1,0^n)) \qquad (12)$$

Assume, in the second embodiment, that A' is (n+1) leading row vectors of the public key A.

Restoration of Random Number Vector

The random number vector $[[r1]]\in R2^M$ is restored by the same method as the random number vector generation method used during encryption using the partial random number vector $[[r'1]]\in R2^{n+1}$. If, for example, Equation (8) is used during encryption, the Equation (8) is used to restore the random vector $[[r1]]$.

Restoration of Subsequent Component Compressed Ciphertext

The j-th component $[[c_{i,j}]]$ of the i-th ciphertext $[[c_i]]$ of the subsequent component compressed ciphertext is obtained as given by Equation (13).

$$[[c_{i,j}]]=Aj^{T\sigma^{j-1}}([[r1]]) \qquad (13)$$

where function σ is the same one used for encryption.

FIG. 6 is a flowchart illustrating an example of a decryption process of the decryption device 30 according to the second embodiment. The decryption device 30 can use any lattice-based cryptographic algorithm. A decryption process using a lattice-based cryptographic algorithm of the BGV scheme as in the first embodiment will be described.

First, the controller 38 operates the decompression and decryption circuit 36. The decompression and decryption circuit 36 receives compressed ciphertext blocks $[[c1]]$ and $([[c_{i,1}]])_{2\leq i\leq M}$ from outside (S601).

The decompression and decryption circuit 36 decrypts the leading component $m_i=[[\{[[c_i]],[[s]]\}]_q]_2$ of the plaintext block in accordance with Equation (11) (S602).

Then, the controller 38 operates the random number restoration circuit 32. The random number restoration circuit 32 restores the partial random number vector $[[r'_i]]=(A'^T)^{-1}([[c_1]]-(m_1,0^n))$ in accordance with Equation (12) (S603). The random number restoration circuit 32 restores the random number vector $[[r1]]\in R2^M$ from the partial random number vector $[[r'1]]$ in accordance with Equation (8) (S604).

The controller 38 sets a loop control variable i to 2 (S606).

The controller 38 sets a loop control variable j to 2 (S607).

The controller 38 operates the decompression and decryption circuit 36. The decompression and decryption circuit 36 restores the j-th component $[[c_{i,j}]]=Aj^{T\sigma j-1}[[r1]])$ of the ciphertext $[[ci]]$ in accordance with Equation (13) (S608).

The controller 38 determines whether j is smaller than n+1 (S609). If j is smaller than n+1 (Yes in S609), the controller 38 increments the loop control variable j by one (S610). Then, the controller 38 executes the process after S608.

If j is equal to or larger than n+1 (No in S609), the controller 38 operates the decompression and decryption circuit 36. The decompression and decryption circuit 36 decrypts the i-th component $m_i=[[\{[[c_i]],[[s]]\}]_q]_2$ of the plaintext block from $[[ci]]$ in accordance with Equation (11) (S611).

The controller 38 increments the loop control variable i by one (S612).

The controller 38 determines whether i is smaller than M (S613). If i is smaller than M (Yes in S613), the controller 38 sets the loop control variable j to 2 (S607). Then, the controller 38 executes the processing after S608.

If i is equal to or larger than N (No in S613), the controller 38 operates the decompression and decryption circuit 36. The decompression and decryption circuit 36 outputs a plaintext block $(m_i)_{1\le i\le M}$ including the leading component $m_1$ decrypted in S602 and the subsequent component $(m_i)_{i\le i\le M}$ encrypted in S611 to the outside (S614). Then, the decryption process ends.

The decryption device 30 according to the second embodiment decrypts a ciphertext not included in the compressed ciphertext block of the lattice-based cryptography and decrypts the compressed ciphertext correctly.

The decryption device 30 according to the second embodiment can be implemented in an SSD controller, a network interface card, an NVMe controller, a cloud server, a client PC, and the like. Examples of the implementation will be described in the third to seventh embodiments.

Third Embodiment

FIG. 7 is a block diagram illustrating an example of a storage system 102 according to a third embodiment.

The storage system 102 is connectable to a host 100. The host 100 is an information processing device that accesses the storage system 102. The host 100 and storage system 102 are designed to configure an information processing system. The storage system 102 is usable as a main storage of the host 100. The storage system 102 may be built in the host 100 or may be provided outside the host 100 and connected to the host 100 via a cable or a network. The host 100 may be a server (storage server) that stores a large amount of and a variety of data in the storage system 102. The host 100 may be a personal computer. The storage system 102 may be a system for business use incorporated into a server of a data center or the like. The storage system 102 may be a system for personal use incorporated into a personal computer. An example of the storage system 102 is a solid state drive (SSD). Hereinafter, the storage system 102 will be referred to as an SSD 102.

The SSD 102 includes a NAND flash memory (hereinafter referred to as a NAND memory) 112 and a controller 110.

The NAND memory 112 is an example of a nonvolatile memory. Instead of the NAND memory, a NOR flash memory, a magneto-resistive random access memory (MRAM), a phase change random access memory (PRAM), a resistive random access memory (ReRAM), and a ferro-electric random access memory (FeRAM) may be used.

The controller 110 is configured to write or read data to or from the NAND memory 112 according to a command (request) sent from the host 100. The controller 110 may be implemented by an electrical circuit such as an SoC.

The controller 110 controls the operation of the SSD 102. The controller 110 includes a host interface (referred to as a host I/F circuit) 122, a NAND interface (referred to as a NAND I/F circuit) 124, a CPU 126, a read only memory (ROM) 128, a random access memory (RAM) 130, an encryption device 132, a decryption device 134, and the like. The host I/F circuit 122, CPU 126, ROM 128, RAM 130, NAND I/F circuit 124, encryption device 132, and decryption device 134 are connected to each other via a bus.

The encryption device 132 corresponds to the encryption device 10 according to the first embodiment. The decryption device 134 corresponds to the decryption device 30 according to the second embodiment. Instead of providing both a calculator for a random number of the encryption device 132 and that of the decryption device 134, a single calculator for a random number may be shared between the encryption device 132 and decryption device 134.

The CPU 126 is a processor configured to control the host I/F circuit 122, NAND I/F circuit 124, encryption device 132, and decryption device 134. In response to the power-on of the SSD 102, the CPU 126 loads a control program (firmware) from the NAND memory 112 or ROM 128 into the RAM 130 and executes the control program to perform various processes. The CPU 126 can perform a process for various requests from the host 100. The operation of the CPU 126 is controlled by a control program to be executed by the CPU 126. Some or all of the processes for requests from the host 100 may be performed by dedicated hardware in the controller 110.

The SSD 102 according to the third embodiment encrypts a plaintext block, which is transmitted from the host 100, through the encryption device 132 and generates a compressed ciphertext block. The SSD 102 writes the compressed ciphertext block to the NAND memory 112. The SSD 102 decrypts the compressed ciphertext block, which is read out of the NAND memory 112, through the decryption device 134 and generates a plaintext block. The SSD 102 transmits the plaintext block to the host 100.

The SSD 102 according to the third embodiment makes it possible to compress a ciphertext block of lattice-based cryptography at the time of encryption. Furthermore, in the SSD 102 according to the third embodiment, a ciphertext not included in the compressed ciphertext block of lattice-based cryptography is restored at the time of decryption, and the ciphertext block is correctly decrypted.

Fourth Embodiment

FIG. 8 is a block diagram illustrating an example of an SSD 202 according to a fourth embodiment. The SSD 202 is an SSD conforming to NVMe standard.

The SSD 202 is connectable to a host 200. The host 200 corresponds to the host 100 according to the third embodiment.

The SSD 102 includes a NAND memory 212 and a controller 210.

The NAND memory 212 corresponds to the NAND memory 112 according to the third embodiment. The controller 210 includes a PCIe™ interface circuit (PCIe I/F circuit) 214 and an NVMe controller 216. The PCIe I/F circuit 214 corresponds to the host I/F circuit 122 according to the third embodiment.

The NVMe controller 216 includes a NAND I/F circuit 220, a CPU 222, a ROM 224, a RAM 226, an encryption device 230, a decryption device 232, and the like. The NAND I/F circuit 220, CPU 222, ROM 224, RAM 226, encryption device 230, and decryption device 232 respectively correspond to the NAND I/F circuit 124, CPU 126, ROM 128, RAM 130, encryption device 132, and decryption device 134 according to the third embodiment. Instead of providing both a calculator for a random number of the encryption device 230 and that of the decryption device 232, a single calculator may be shared between the encryption device 230 and decryption device 230 and 232.

According to the fourth embodiment, even in the SSD 202 conforming to NVMe standard, a ciphertext block of lattice-based cryptography is compressed at the time of encryption, a ciphertext not included in the compressed ciphertext block of lattice-based cryptography is restored at the time of decryption, and the ciphertext block is correctly decrypted.

Fifth Embodiment

FIG. 9 is a block diagram illustrating an example of an information processing system according to a fifth embodiment. The information processing system includes a host 300 and an SSD 302. The SSD 302 is connectable to the host 300.

The host 300 controls the operation of the SSD 302. The host 300 includes an SSD interface (referred to as an SSD I/F circuit) 310, a CPU 314, a ROM 316, a RAM 318, an encryption device 320, a decryption device 322, and the like. The SSD I/F circuit 310, CPU 314, ROM 316, RAM 318, encryption device 320, and decryption device 322 are connected to each other via a bus.

The encryption device 320 corresponds to the encryption device 10 according to the first embodiment. The encryption device 320 encrypts a plaintext block generated by the host 300 or a plaintext block input to the host 300. The decryption device 322 corresponds to the decryption device 30 according to the second embodiment. The decryption device 322 decrypts a ciphertext block transmitted from the SSD 302 and generates a plaintext block. Instead of providing both a calculator for a random number of the encryption device 320 and that of the decryption device 322, a single calculator may be shared between the encryption device 320 and decryption device 322. The SSD I/F circuit 310 is a communication circuit that transmits a ciphertext to the SSD 302 and receives a ciphertext from the SSD 302.

The CPU 314 is a processor configured to control the SSD I/F circuit 310, encryption device 320 and decryption device 322. In response to the power-on of the host 300, the CPU 314 loads a control program (firmware) from the ROM 316 into the RAM 318 and executes the control program to perform various processes.

The SSD 302 includes a NAND memory 332 and a controller 330.

The NAND memory 332 corresponds to the NAND memory 112 according to the third embodiment. The controller 330 includes a host I/F circuit 334, a NAND I/F circuit 336, a CPU 340, a ROM 342, a RAM 346, and the like. The host I/F circuit 334, NAND I/F circuit 336, CPU 340, ROM 342, and RAM 346 respectively correspond to the host I/F circuit 122, NAND I/F circuit 124, CPU 126, ROM 128, and RAM 130 according to the third embodiment.

According to the fifth embodiment, the host 300 includes the encryption device 320 and decryption device 322. Thus, even if the SSD 302 does not include an encryption device nor a decryption device, the SSD 302 can store compressed ciphertext blocks. The host 300 may include one of the encryption device 320 and decryption device 322. The controller 330 of the SSD 302 may include the other of the encryption device 320 and decryption device 322.

Sixth Embodiment

FIG. 10 is a block diagram illustrating an example of an SSD 404 according to a sixth embodiment.

The SSD 404 is connectable to a server 402 via a network 400.

The server 402 controls the operation of the SSD 404. The server 402 corresponds to the host 100 of the third embodiment or the host 200 of the fourth embodiment.

The SSD 404 includes a controller 410 and a NAND memory 412. The NAND memory 412 corresponds to the NAND memory 112 according to the third embodiment. The controller 410 corresponds to the controller 110 of the third embodiment. However, the controller 410 differs from the controller 110 in that it includes a network interface card (NIC) 422 in place of the host I/F circuit 122. The NIC 422 includes an encryption device 430, a decryption device 432, and the like. The encryption device 430 corresponds to the encryption device 10 of the first embodiment. The decryption device 432 corresponds to the decryption device 30 of the second embodiment. Instead of providing both a calculator for a random number of the encryption device 430 and that of the decryption device 432, a single calculator may be shared between the encryption device 430 and decryption device 432.

The controller 410 includes the NIC 422, a CPU 442, a ROM 444, a RAM 446, and a NAND I/F circuit 242. The CPU 442, ROM 444, RAM 446, and NAND I/F circuit 242 respectively correspond to the CPU 126, ROM 128, RAM 130, and NAND I/F circuit 124 of the third embodiment, or the CPU 222, ROM 224, RAM 226, and NAND I/F circuit 220 of the fourth embodiment, or the CPU 340, ROM 342, RAM 344, and NAND I/F circuit 336 of the fifth embodiment.

According to the sixth embodiment, it is possible to store a lossless compressed ciphertext block even in the SSD 404 that is directly connectable to the network 400.

Seventh Embodiment

FIG. 11 is a block diagram illustrating an example of an information processing system according to a seventh embodiment. The information processing system includes a server 504 and SSDs 502-1, 502-2, and 502-3.

The SSDs 502-1, 502-2, and 502-3 are connectable to the server 504 via a network 500.

The server 504 controls the operations of the SSDs 502-1, 502-2, and 502-3. The server 504 corresponds to the host 300 of the fifth embodiment.

The seventh embodiment differs from the sixth embodiment in the arrangement of an encryption device and a decryption device. In the sixth embodiment, the NIC 422 of the SSD 404 includes the encryption device 430 and decryption device 432. In the seventh embodiment, the server 504 includes an encryption device 514 and a decryption device 516.

The server 504 controls the operations of the SSDs 502-1, 502-2, and 502-3. The server 504 includes a network I/F circuit 512, an encryption device 514, a decryption device 516, a CPU 522, a ROM 524, a RAM 526, and the like. The encryption device 514 corresponds to the encryption device 10 of the first embodiment. The decryption device 516 corresponds to the decryption device 30 of the second embodiment. The CPU 522, ROM 524, and RAM 526 respectively correspond to the CPU 314, ROM 316, and RAM 318 of the fifth embodiment.

According to the information processing system of the seventh embodiment, the server 504 includes the encryption device 514 and decryption device 516. Thus, even if each of the SSDs 502-1, 502-2, and 502-3 does not include an encryption device nor a decryption device, a compressed ciphertext block is stored in the SSDs 502-1, 502-2, and 502-3. The server 504 may include one of the encryption device 514 and decryption device 516. The SSDs 502-1, 502-2, and 502-3 may include the other of the encryption device 514 and decryption device 516.

Eighth Embodiment

FIG. 12 is a block diagram illustrating an example of a decompression device 602 for a compressed ciphertext according to an eighth embodiment. The compressed ciphertext block generated by the encryption device according to any one of the first and third to seventh embodiments is input to the decompression device 602. The decompression device 602 includes a homomorphic random number restoration circuit 606, a calculator 608 for a homomorphic random number, a homomorphic decompression circuit 604, and a controller 610. The homomorphic random number restoration circuit 606, calculator 608, homomorphic decompression circuit 604, and controller 610 may be implemented by hardware such as a dedicated electrical circuit (for example, a silicon on a chip (SoC)) or by programs (software) to be executed by a processor (not shown).

From a leading component ciphertext and a public key related to a ciphertext block, the homomorphic random number restoration circuit 606 performs homomorphic restoration of an N-dimensional random number vector that is encrypted by the public key.

The calculator 608 calculates, a predetermined number of times, a value of the predetermined function σ for the N-dimensional random number vector encrypted by the public key. The calculator 608 outputs a result of the calculation to the homomorphic decompression circuit 604.

The homomorphic decompression circuit 604 reads a compressed ciphertext block from outside. The compressed ciphertext block includes a leading component ciphertext and a list of subsequent component compressed ciphertexts. The homomorphic decompression circuit 604 decompresses the compressed ciphertext block and outputs a ciphertext block. The homomorphic decompression circuit 610 outputs the leading component ciphertext to the outside as it is. The homomorphic decompression circuit 604 determines the first row of a transposed matrix of the public key. The homomorphic decompression circuit 604 calculates, a predetermined number of times, a value of the predetermined function σ for the N-dimensional random vector encrypted by the public key. The homomorphic decompression circuit 604 obtains a product of the first row of the transposed matrix of the public key and a result of the calculation. The homomorphic decompression circuit 604 obtains differences between the product and the subsequent component compressed ciphertexts encrypted by the public key. The homomorphic decompression circuit 604 outputs the differences to the outside as a leading subcomponent of each of the subsequent component compressed ciphertexts and its subsequent subcomponents thereof. The homomorphic decompression circuit 604 outputs a ciphertext block including the leading component ciphertext and the subsequent component ciphertexts.

FIG. 13 is a diagram illustrating an example of a plaintext block to be input to the decompression device 602 according to the eighth embodiment. The plaintext block includes M time-series components $m_1$, $m_2$ . . . $m_M$. M is larger than 1 (M>1). Each of the components $m_1$, $m_2$ . . . $m_M$ is a member of ring $R_2$.

Different encryptions are performed for the leading component $m_1$ located at the head of a plaintext block and components $m_2$ . . . $m_M$ subsequent to the leading component $m_1$.

The leading component $m_1$ is encrypted by a public key and a random number vector to generate a leading component ciphertext including (n+1) ciphertexts.

Each of the subsequent components $m_2$ . . . $m_M$ is encrypted by a public key and the function σ to generate a subsequent component compressed ciphertext including (N−1) ciphertexts.

The subsequent component compressed ciphertext includes a list of leading sub-component ciphertexts only and not subsequent sub-component ciphertexts.

The decompression device 602 receives a compressed ciphertext block including a leading component ciphertext and a list of subsequent component compressed ciphertexts.

The controller 610 controls the operation timings of the homomorphic random number restoration circuit 606, calculator 608, and homomorphic decompression circuit 604.

The generation process of the compressed ciphertext block input to the decompression device 602 will be described. The decompression device 602 utilizes lattice-based cryptography. The lattice-based cryptography is cipher constructed using a lattice. The lattice is a set of vectors that can be represented by an integer linear combination of basis vectors. N row vectors or random number vectors of a public key are members of one lattice. A variety of lattice encryption algorithms are put into practical use. The decompression device 602 can use any lattice encryption algorithm. As an example of the lattice encryption algorithm, the BGV scheme will be described. An example of the BGV scheme is described in the paper of Zvika Brakerski et al. described in the first embodiment.

The configurations of the private key, public key, random number vector, leading component ciphertext, list of subsequent component compressed ciphertexts, and function σ according to the eighth embodiment are the same as those according to the first embodiment. The detailed explanation is not repeated.

Private key [[s]] is represented by Equations (1) and (2).

Public key $A \in Rq^{N(n+1)}$ is represented by Equations (3) to (6) using [[t]] included in the private key [[s]].

The homomorphic random number restoration circuit 606 generates the random number vector $[[r1]] \in R2^N$ from the partial random number vector $[[r'1]] \in R2^{n+1}$ as given by Equations (7) and (8).

The leading component ciphertext $[[c1]] \in Rq^{n+1}$ is generated from the leading component $m_1$, public key A, and random number vector $[[r1]]$ as given by Equation (9).

The i-th component $[[c_{i,1}]]$ of a list of subsequent component compressed ciphertexts $([[c_{i,1}]])_{2 \le i \le M}$ is generated as given by Equation 10.

Various functions can be utilized as function σ to be used by the calculator 608.

FIG. 14 is a flowchart illustrating an example of the decompression process of the decompression device 602 according to the eighth embodiment.

First, the controller 610 operates the homomorphic decompression circuit 604 for the leading component ciphertext. The homomorphic decompression circuit 604 receives a compressed ciphertext block [[c1]](=Enc(pk,m1)) and ([[c$_{i,1}$]])$_{2≤i≤M}$ from outside (S1401).

The controller 610 operates the homomorphic random number restoration circuit 606. The homomorphic random number restoration circuit 606 performs homomorphic restoration of partial random number vector Enc(pk,r'$_{1,j}$)= (A'$^T$)$^{-1}${Enc(pk,c$_{1,j}$)–(Enc(pk,m1), Enc(pk,0)$^n$)} encrypted by the public key pk (=A) (S1402), where 1≤j≤n+1.

The homomorphic random number restoration circuit 606 performs homomorphic restoration of the random number vector Enc(pk,[[r1]])=(Enc(pk,r'$_{1,j}$))$_{1≤j≤n+1}$ encrypted by the public key pk from the partial random number vector (Enc(pk,r'$_{1,j}$))$_{1≤j≤n+1}$ encrypted by the public key pk (S1403). When the homomorphic random number restoration circuit 606 restores the encrypted partial random number vector, the encrypted random number vector is obtained. Since the random number vector is represented by Equation (8), the encrypted random number vector is represented by Equation (14).

$$Enc(pk, r_{1,i}) = \begin{cases} Enc(pk, r'_{1,i}) & 1 \le i \le n+1 \\ \sum_{j=1}^{n+1} b_{i-(n+1),j} \cdot Enc(pk, r'_{1,i}) & n+1 < i \le N \end{cases} \quad (14)$$

The controller 610 sets the loop control variable i (row number) to 2 (S1404).

Then, the controller 610 operates the homomorphic decompression circuit 604 for the subsequent component compressed ciphertext. The homomorphic decompression circuit 604 calculates Enc(pk,[[c$_{i,1}$]]) (S1405). Enc(pk,[[c$_{i,1}$]]) is used for later processing.

The homomorphic decompression circuit 604 calculates Enc(pk,A$_1$$^{Tσ^{i-1}}$([[r1]]))=A$_1$$^T$(Enc(pk,σ$_{j-1}$([[r1]])))=A$_1$$^{Tσj-1}$ (Enc(pk,([[r1]])) (S1406).

The homomorphic decompression circuit 604 calculates [[ci]]=Enc(pk,mi)=Enc(pk,[[c$_{i,1}$]]–Enc(pk,A$_1$$^{Tσ^{i-1}}$([[r1]])) (S1407). The function σ is raised to the power of i–1. If, therefore, i is equal to 2, it is raised to the power of σ, and the function σ is applied once in the calculation of the compressed ciphertext block [[ci]].

The controller 610 increments the loop control variable i by one (S1408).

The controller 610 determines whether i is smaller than M (i≤M) (S1409). If i is smaller than M (Yes in S1409), the controller 610 operates the homomorphic decompression circuit 604 for the next subsequent component compressed ciphertext (S1405).

If i is equal to or larger than M (i≥M) (No in S1409), the controller 610 operates the homomorphic decompression circuit 604. The homomorphic decompression circuit 604 outputs to the outside a ciphertext block ([[ci]])$_{1≤i≤M}$ including the leading component ciphertext [[c1]] and the subsequent component compressed ciphertext ([[ci]])$_{2≤i≤M}$ generated in S1407 (S1410). Then, the decompression process ends.

FIG. 15 is a diagram illustrating an example of the layout of the compressed ciphertext block input to the decompression device 602. Each of the rows in FIG. 15 corresponds to the ciphertext of each component of the plaintext block shown in FIG. 13.

According to the eighth embodiment, the leading component ciphertext [[c1]] for the leading component m1, which is to be input to the decompression device 602, includes the ciphertexts [[c$_{1,1}$]], [[c$_{1,2}$]] . . . [[c$_{1,n+1}$]] of (n+1) subcomponents in the first row enclosed by the bold frame in FIG. 15. The subsequent component compressed ciphertext list ([[c$_{i,1}$]])$_{2≤i≤M}$ for the subsequent component m$_i$(2≤i≤M), which is to be input to the decompression device 602, includes only the ciphertexts [[c$_{2,1}$]] . . . [[c$_{M,1}$]] of the leading subcomponent enclosed by the bold frame in FIG. 15. The subsequent component compressed ciphertext list ([[c$_{i,1}$]])$_{2≤i≤M}$ does not include the ciphertexts [[c$_{2,2}$]] . . . [[c$_{2,n+1}$]]; . . . ; [[c$_{M,2}$]] . . . [[c$_{M,n+1}$]] (ciphertexts enclosed by the broken frame in FIG. 15) of the subcomponents other than the leading subcomponent. This reduces the number of ciphertexts in a lattice-based cryptography ciphertext block from M×(n+1) to M+n, thus decreasing the size of the ciphertext block.

Since the public key A is a matrix of N rows and (n+1) columns with an (n+1)-dimensional regular submatrix, a regular submatrix A' containing specific (n+1) row vectors among N row vectors of the public key A is configured to have an inverse matrix. Therefore, a partial random number vector can be restored using the inverse of the submatrix A' in accordance with Equation (12) described in the second embodiment. A random number vector encrypted by the public key A can be restored from the restored partial random number vector by Equation (9) described in the first embodiment. The ciphertexts [[c$_{2,2}$]] . . . [[c$_{2,n+1}$]]; . . . ; [[c$_{M,2}$]] . . . [[c$_{M,n+1}$]] corresponding to the subcomponents other than the leading subcomponent of the subsequent component compressed ciphertext not included in the compressed ciphertext block are restored in the decompression device 602. Homomorphic operation such as homomorphic addition and homomorphic multiplication can be performed on the restored ciphertext block.

The decompression device 602 according to the eighth embodiment can be implemented in an SSD controller, a network interface card, an NVMe controller, a cloud server, a client PC, and the like. The eighth embodiment is implemented in the same manner as the third to seventh embodiments.

Ninth Embodiment

FIG. 16 is a block diagram illustrating an example of an SSD 702 according to a ninth embodiment.

The SSD 702 is connectable to a host 700. The host 700 is an information processing device that accesses the SSD 702. The host 700 and SSD 702 are designed to configure an information processing system. The SSD 702 is usable as a main storage of the host 700. The SSD 702 may be built in the host 700 or may be provided outside the host 700 and connected to the host 700 via a cable or a network. The host 700 may be a server (storage server) that stores a large amount of and a variety of data in the SSD 702. The host 700 may be a personal computer. The SSD 702 may be a system for business use incorporated into a server of a data center or the like. The SSD 702 may be a system for personal use incorporated into a personal computer.

The SSD 702 includes a NAND memory 712 and a controller 710.

The NAND memory 712 is an example of a nonvolatile memory. Instead of the NAND memory, a NOR flash memory, a magneto-resistive random access memory (MRAM), a phase change random access memory (PRAM), a resistive random access memory (ReRAM), and a ferroelectric random access memory (FeRAM) may be used.

The controller 710 is configured to write or read data to or from the NAND memory 712 according to a command (request) sent from the host 700. The controller 710 may be implemented by an electrical circuit such as a SoC.

The controller 710 controls the operation of the SSD 702. The controller 710 includes a host I/F circuit 722, a NAND I/F circuit 724, a CPU 726, a read only memory (ROM) 728, a random access memory (RAM) 730, a decompression device 732, and the like. The host I/F circuit 722, CPU 726, ROM 728, RAM 730, NAND I/F circuit 724, and decompression device 732 are connected to each other via a bus.

The decompression device 732 corresponds to the decompression device 60 according to the eighth embodiment.

The CPU 726 is a processor configured to control the host I/F circuit 722, NAND I/F circuit 724, and decompression device 732. In response to the power-on of the SSD 702, the CPU 726 loads a control program (firmware) from the NAND memory 712 or ROM 728 into the RAM 730 and executes the control program to perform various processes. The CPU 726 can perform a process for various requests from the host 700. The operation of the CPU 726 is controlled by a control program to be executed by the CPU 726. Some or all of the processes for requests from the host 700 may be performed by dedicated hardware in the controller 710.

The SSD 702 according to the ninth embodiment decompresses a compressed ciphertext block from the host 700 by the decompression device 732 and generates a ciphertext block. The SSD 702 writes the ciphertext block to the NAND memory 712.

The SSD 702 according to the ninth embodiment makes it possible to decompress a compressed ciphertext block of lattice-based cryptography. A device other than the SSD 702, for example, the host 700 decrypts the ciphertext block.

Tenth Embodiment

FIG. 17 is a block diagram illustrating an example of an SSD 752 according to a tenth embodiment.

The SSD 752 is connectable to a host 750. The host 750 corresponds to the host 700 according to the ninth embodiment.

The SSD 752 includes a NAND memory 762 and a controller 760.

The NAND memory 762 corresponds to the NAND memory 712 according to the ninth embodiment. The controller 760 corresponds to the controller 710 according to the ninth embodiment.

The controller 760 includes a host I/F circuit 772, a NAND I/F circuit 774, a CPU 776, a read only memory (ROM) 778, a random access memory (RAM) 780, a decompression device 782, and a secure calculator 784, and the like. The host I/F circuit 772, CPU 776, ROM 778, RAM 780, NAND I/F circuit 774, and decompression device 782 respectively correspond to the host I/F circuit 722, CPU 726, ROM 728, RAM 730, NAND I/F circuit 724, and decompression device 732 according to the ninth embodiment.

The SSD 752 according to the tenth embodiment receives a compressed ciphertext block transmitted from the host 750, decompresses the compressed ciphertext block, and generates a ciphertext block. The SSD 752 writes the ciphertext block to the NAND memory 762 or RAM 780.

The secure calculator 784 reads the ciphertext block from the NAND memory 762 or RAM 780. The secure calculator 784 performs a secure calculation on the ciphertext block. Examples of the calculation include addition, multiplication, or function value calculation. The secure calculator 784 may perform a noise reduction (bootstrapping) process on the result of the calculation. The secure calculator 784 writes the result to the NAND memory 762 or RAM 780. Other operations of the SSD 752 are same as those of the SSD 702 according to the ninth embodiment. According to the tenth embodiment, the SSD 752 decompresses the compressed ciphertext block and performs a secure calculation on the decompressed ciphertext block. A device other than the SSD 752, for example, the host 750 decrypts the ciphertext block.

Eleventh Embodiment

FIG. 18 is a block diagram illustrating an example of an SSD 802 according to an eleventh embodiment. The SSD 802 is an SSD conforming to NVMe standard.

The SSD 802 is connectable to a host 800. The host 800 corresponds to the host 750 according to the tenth embodiment.

The SSD 802 includes a NAND memory 812 and a controller 810.

The NAND memory 812 corresponds to the NAND memory 762 according to the tenth embodiment. The controller 810 includes a PCIe I/F circuit 822 and an NVMe controller 820. The PCIe I/F circuit 822 corresponds to the host I/F circuit 772 according to the tenth embodiment.

The NVMe controller 820 includes a NAND I/F circuit 824, a CPU 826, a ROM 828, a RAM 830, a decompression device 832, a secure calculator 834, and the like. The NAND I/F circuit 824, CPU 826, ROM 828, RAM 830, decompression device 832, and secure calculator 834 respectively correspond to the NAND I/F circuit 774, CPU 776, ROM 778, RAM 780, decompression device 782, and secure calculator 784 according to the tenth embodiment.

According to the eleventh embodiment, even in the SSD 802 conforming to NVMe standard, a compressed ciphertext block of lattice-based cryptography is decompressed and a secure calculation is performed on the ciphertext block. A device other than the SSD 802, for example, the host 800 decrypts the ciphertext block.

Twelfth Embodiment

FIG. 19 is a block diagram illustrating an example of an information processing system according to a twelfth embodiment. The information processing system includes a host 850 and an SSD 852. The SSD 852 is connectable to the host 850.

The host 850 controls the operation of the SSD 852. The host 850 includes an SSD interface (referred to as an SSD I/F circuit) 862, a CPU 864, a ROM 866, a RAM 868, a decompression device 870, and a secure calculator 872, and the like. The SSD I/F circuit 862, CPU 864, ROM 866, RAM 868, decompression device 870, and secure calculator 872 are connected to each other via a bus.

The decompression device 870 corresponds to the decompression device 602 according to the eighth embodiment. The decompression device 870 decompresses a compressed ciphertext block transmitted from the host 850 and generates a ciphertext block. The decompression device 870 writes the ciphertext block to the RAM 868 or transmits the result to the SSD 852.

The secure calculator 872 corresponds to the secure calculator 784 according to the tenth embodiment. The secure calculator 872 reads the ciphertext block from the RAM 862 or SSD 852. The secure calculator 872 performs a secure calculation on the ciphertext block. Examples of the calculation include addition, multiplication, or function value calculation. The secure calculator 872 may perform a noise reduction (bootstrapping) process on the result of the calculations. The secure calculator 872 writes the result to the RAM 868 or transmits the result to the SSD 852.

The SSD I/F circuit 862 is a communication circuit which transmits a ciphertext or ciphertext block to the SSD 852 and receives a ciphertext or ciphertext block from the SSD 852.

The CPU 864 is a processor configured to control the SSD I/F circuit 862, NAND I/F circuit 862, decompression device 870, and secure calculator 872. In response to the power-on of the host 850, the CPU 864 loads a control program (firmware) from the ROM 866 into the RAM 868 and executes the control program to perform various processes.

The SSD 852 includes a controller 880 and a NAND memory 882.

The NAND memory 882 corresponds to the NAND memory 762 according to the tenth embodiment. The controller 880 includes a host I/F circuit 890, a CPU 894, a ROM 896, a RAM 898, and a NAND I/F circuit 892. The host I/F circuit 890, CPU 894, ROM 896, RAM 898, and NAND I/F circuit 892 respectively correspond to the host I/F circuit 772, CPU 776, ROM 778, RAM 780, and NAND I/F circuit 774 according to the tenth embodiment.

According to the twelfth embodiment, the host 850 includes the decompression device 870 and secure calculator 872. Thus, even if the SSD 852 does not include a decompression device and a secure calculator, a compressed ciphertext block is stored in the SSD 852. The host 850 may include one of the decompression device 870 and secure calculator 872 and the SSD 852 may include the other of the decompression device 870 and secure calculator 872.

Thirteenth Embodiment

FIG. 20 is a block diagram illustrating an example of an SSD 902 according to a thirteenth embodiment.

The SSD 902 is connectable to a server 900 through a network 904.

The SSD 902 controls the operation of the SSD 902. The server 900 corresponds to the host 750 of the tenth embodiment or the host 800 of the eleventh embodiment.

The SSD 902 includes a controller 910 and a NAND memory 912. The NAND memory 912 corresponds to the NAND memory 762 according to the tenth embodiment. The controller 910 corresponds to the controller 760 of the tenth embodiment. However, the controller 910 differs from the controller 760 in that it includes a NIC 920 in place of the host I/F circuit 772. The NIC 920 includes a decompression device 922, a secure calculator 924, and the like. The decompression device 922 corresponds to the decompression device 602 of the eight embodiment. The secure calculator 924 corresponds to the secure calculator 784 of the tenth embodiment.

The controller 910 includes the NIC 920, a CPU 930, a ROM 932, a RAM 934, and a NAND I/F circuit 936. The CPU 930, ROM 932, RAM 934, and NAND I/F circuit 936 respectively correspond to the CPU 776, ROM 778, RAM 780, and NAND I/F circuit 774 of the tenth embodiment, or the CPU 826, ROM 828, RAM 830, and NAND I/F circuit 824 of the eleventh embodiment, or the CPU 894, ROM 896, RAM 898, and NAND I/F circuit 892 of the twelfth embodiment.

According to the thirteenth embodiment, the SSD 902 directly connected to the server 900 decompresses a compressed ciphertext block and performs a secure calculation on a ciphertext block.

Fourteenth Embodiment

FIG. 21 is a block diagram illustrating an example of an information processing system according to a fourteenth embodiment. The information processing system includes a server 950 and SSDs 952-1, 952-2, and 952-3.

The SSDs 952-1, 952-2, and 952-3 are connectable to the server 950 via a network 954.

The server 950 controls the operations of the SSDs 952-1, 952-2, and 952-3. The server 950 corresponds to the host 850 of the twelfth embodiment.

The fourteenth embodiment differs from the thirteenth embodiment in the arrangement of a decompression device and a secure calculator. In the thirteenth embodiment, the NIC 920 of the SSD 902 includes the decompression device 922 and secure calculator 924. In the fourteenth embodiment, the server 950 includes a decompression device 960 and a secure calculator 962.

The server 950 controls the operations of the SSDs 952-1, 952-2, and 952-3. The server 950 includes a network I/F circuit 964, the decompression device 960, the secure calculator 962, a CPU 966, a ROM 968, a RAM 970, and the like. The decompression device 960 corresponds to the decompression device 602 of the eighth embodiment. The secure calculator 962 corresponds to the secure calculator 784 of the tenth embodiment. The CPU 966, ROM 968, and RAM 970 respectively correspond to the CPU 864, ROM 866, and RAM 868 of the twelfth embodiment.

According to the information processing system of the fourteenth embodiment, the server 950 includes the decompression device 960 and secure calculator 962. Thus, even if each of the SSDs 952-1, 952-2, and 952-3 does not include a decompression device and a secure calculator, a ciphertext block is stored in the SSDs 952-1, 952-2, and 952-3. The server 950 may include one of the decompression device 960 and secure calculator 962. The SSDs 952-1, 952-2, and 952-3 may include the other of the decompression device 960 and secure calculator 962.

While certain embodiments have been described, these embodiments have been presented by way of example only, and are not intended to limit the scope of the inventions. Indeed, the novel devices and methods described herein may be embodied in a variety of other forms; furthermore, various omissions, substitutions, and changes in the form according to the embodiments described herein may be made without departing from the spirit of the inventions. The accompanying claims and their equivalents are intended to cover such forms or modification as would fall within the scope and spirit of the inventions.

What is claimed is:

1. A decompression device including circuitry to receive a compressed ciphertext block and decompress the compressed ciphertext block including a leading component ciphertext and subsequent component compressed ciphertexts and output a ciphertext block, wherein:

the leading component ciphertext includes a leading subcomponent and a subsequent subcomponent;

each of the subsequent component compressed ciphertexts includes a leading subcomponent;

the decompression device comprises:

a random number restoration circuit to restore a random number vector encrypted by a public key relating to the ciphertext block from the leading component ciphertext;

a calculator circuit to calculate a value of predetermined function for the random number vector encrypted by the public key; and a decompression circuit to receive compressed ciphertext blocks, calculate a difference between each of the subsequent component compressed ciphertexts and a product as the leading subcomponent of each of the subsequent component ciphertexts, each of the subsequent component compresses ciphertexts being encrypted by the public key, the product being a leading row of a transposed matrix of the public key and the value of the predetermined function for the random number vector encrypted by the public key, and output a ciphertext block including the leading component ciphertext and the subsequent component ciphertexts.

2. A storage system comprising:

a decompression device including circuitry to receive a compressed ciphertext block and decompress the compressed ciphertext block including a leading component ciphertext and subsequent component compressed ciphertexts and output a ciphertext block, wherein:

the leading component ciphertext includes a leading subcomponent and a subsequent subcomponent;

each of the subsequent component compressed ciphertexts includes a leading subcomponent;

the decompression device comprises:

a random number restoration circuit to restore a random number vector encrypted by a public key relating to the ciphertext block from the leading component ciphertext;

a calculator circuit to calculate a value of predetermined function for the random number vector encrypted by the public key; and a decompression circuit to calculate a difference between each of the subsequent component compressed ciphertexts and a product as the leading subcomponent of each of the subsequent component ciphertexts, each of the subsequent component compresses ciphertexts being encrypted by the public key, the product being a leading row of a transposed matrix of the public key and the value of the predetermined function for the random number vector encrypted by the public key, and output a ciphertext block including the leading component ciphertext and the subsequent component ciphertexts;

a storage medium; and a controller circuit to write the ciphertext block output from the decompression device to the storage medium.

3. The storage system of claim 2, wherein the controller includes a calculator circuit to perform a secure calculation on the ciphertext block output from the decompression device in an encrypted state and write a result of the secure calculation to the storage medium.

4. An information processing device comprising:

a decompression device including circuitry to receive a compressed ciphertext block and decompress the compressed ciphertext block including a leading component ciphertext and subsequent component compressed ciphertexts and output a ciphertext block, wherein:

the leading component ciphertext includes a leading subcomponent and a subsequent subcomponent;

each of the subsequent component compressed ciphertexts includes a leading subcomponent;

the decompression device comprises:

a random number restoration circuit to restore a random number vector encrypted by a public key relating to the ciphertext block from the leading component ciphertext;

a calculator circuit to calculate a value of predetermined function for the random number vector encrypted by the public key; and a decompression circuit to calculate a difference between each of the subsequent component compressed ciphertexts and a product as the leading subcomponent of each of the subsequent component ciphertexts, each of the subsequent component compresses ciphertexts being encrypted by the public key, the product being a leading row of a transposed matrix of the public key and the value of the predetermined function for the random number vector encrypted by the public key, and output a ciphertext block including the leading component ciphertext and the subsequent component ciphertexts; and a calculator circuit to perform a calculation on the ciphertext block output from the decompression device in an encrypted state.

5. A decompression method for receiving a compressed ciphertext block and decompressing the compressed ciphertext block including a leading component ciphertext and subsequent component compressed ciphertexts and outputting a ciphertext block, wherein:

the leading component ciphertext includes a leading subcomponent and a subsequent subcomponent; and each of the subsequent component compressed ciphertexts includes a leading subcomponent;

the decompression method comprises:

restoring a random number vector encrypted by a public key relating to the ciphertext block from the leading component ciphertext;

calculating a value of a predetermined function for the random number vector encrypted by the public key;

calculating a difference between each of the subsequent component compressed ciphertexts and a product as the leading subcomponent of each of the subsequent component ciphertexts, each of the subsequent component compresses ciphertexts being encrypted by the public key, the product being a leading row of a transposed matrix of the public key and the value of the predetermined function for the random number vector encrypted by the public key; and outputting a ciphertext block including the leading component ciphertext and the subsequent component ciphertexts.

6. The decompression device of claim 1, wherein the decompressed ciphertext block includes the leading component ciphertext and a list of ciphertexts of leading subcomponents of the subsequent component compressed ciphertexts.

7. The decompression device of claim 1, wherein the compressed ciphertext block relates to a lattice-based cryptography which is cipher constructed using a lattice; and the lattice is a set of vectors that is represented by an integer linear combination of basis vectors.

8. The decompression device of claim 1, wherein each of the subsequent component compressed ciphertexts does not include subsequent subcomponents.

9. The decompression device of claim 1, wherein
a random number restoration circuit is configured to perform homomorphic restoration of a partial random number vector encrypted by the public key and homomorphic restoration of the random number vector encrypted by the public key from the partial random number vector.

10. The decompression device of claim 1, wherein
the predetermined function comprises a bit-rotation function, a one-way function, or a permutation function.

11. The decompression device of claim 1, wherein
the public key comprises N row vectors including an N-row and (n+1)-column matrix having (n+1)-dimensional regular submatrix;
the random number vector comprises an N-dimensional random number vector generated from (n+1)-dimensional primary independent partial random number vector;
n and N are positive integers; and
(n+1) is smaller than N.

12. The decompression device of claim 11, wherein
the leading component ciphertext corresponds to a leading component; and the leading component ciphertext comprises a ciphertext generated by encrypting the leading component with the public key and the N-dimensional random number vector.

13. The decompression device of claim 12, wherein
the subsequent component compressed ciphertexts respectively correspond to subsequent component plaintexts;
the subsequent component compressed ciphertexts respectively comprise ciphertexts; and
each of the ciphertexts of the subsequent component compressed ciphertexts is generated by encrypting each of the subsequent component plaintexts with the public key and a value obtained by calculating, a predetermined number of times, a value of a predetermined function for the N-dimensional random number vector.

14. The decompression device of claim 12, wherein
an i-th row of the (n+1)-dimensional regular submatrix matches an i-th row of the public key; and
an i-th component of the random number vector coincides with an i-th component of the (n+1)-dimensional primary independent partial random number vector.

* * * * *